United States Patent
Akhondi et al.

(10) Patent No.: US 11,537,788 B2
(45) Date of Patent: Dec. 27, 2022

(54) METHODS, SYSTEMS, AND STORAGE MEDIA FOR AUTOMATICALLY IDENTIFYING RELEVANT CHEMICAL COMPOUNDS IN PATENT DOCUMENTS

(71) Applicant: Elsevier, Inc., New York, NY (US)

(72) Inventors: Saber A. Akhondi, Rotterdam (NL); Hinnerk Rey, Heidelberg (DE); Markus Schwoerer, Karlstein (DE); Heike Nau, Wiesbaden (DE); Gabriele Ilchmann, Königstein (DE); Matthias Irmer, Liepzig (DE); Claudia Bobach, Halle (DE)

(73) Assignees: Elsevier, Inc., New York, NY (US); Ontochem GmbH

( * ) Notice: Subject to any disclaimer, the term of this patent is extended or adjusted under 35 U.S.C. 154(b) by 187 days.

(21) Appl. No.: 16/978,467

(22) PCT Filed: Mar. 6, 2019

(86) PCT No.: PCT/US2019/020907
§ 371 (c)(1),
(2) Date: Sep. 4, 2020

(87) PCT Pub. No.: WO2019/173444
PCT Pub. Date: Sep. 12, 2019

(65) Prior Publication Data
US 2021/0004586 A1 Jan. 7, 2021

Related U.S. Application Data

(60) Provisional application No. 62/639,656, filed on Mar. 7, 2018.

(51) Int. Cl.
*G06F 40/20* (2020.01)
*G06F 16/93* (2019.01)
*G06F 40/149* (2020.01)

(52) U.S. Cl.
CPC .......... *G06F 40/20* (2020.01); *G06F 16/93* (2019.01); *G06F 40/149* (2020.01); *G06F 2216/11* (2013.01)

(58) Field of Classification Search
CPC ........ G06F 40/20; G06F 16/93; G06F 40/149; G06F 2216/11; G06V 30/422
See application file for complete search history.

(56) References Cited

U.S. PATENT DOCUMENTS

| 4,642,762 A | 2/1987 | Fisanick |
| 7,924,270 B2 | 4/2011 | Phelan et al. |

(Continued)

FOREIGN PATENT DOCUMENTS

WO   WO-2008130397 A1 * 10/2008 ......... G06F 17/2235

OTHER PUBLICATIONS

Akhondi,S., Rey,H., Schwörer,M. et al. Automatic identification of relevant chemical compounds from patents. Database (2019) vol. 2019: article ID baz001; doi:10.1093/database/baz001. 14 pages. (Year: 2019).*

(Continued)

*Primary Examiner* — Amy M Levy
(74) *Attorney, Agent, or Firm* — Dinsmore & Shohl LLP

(57) ABSTRACT

Methods, systems, and non-transitory media for training a chemical entity recognition system to extract chemical compounds from a patent document and determine a relevance of the chemical compounds to the patent document are disclosed. A method includes obtaining patent documents from patent databases, normalizing each patent document into a unified format, and generating a chemical patent corpus. The chemical patent corpus includes chemical entities, each having relevancy annotations that indicate a relevance to the patent document from which the chemical entity is extracted. The method further includes providing (Continued)

the chemical patent corpus to the chemical entity recognition system, which tags the one or more chemical entities in a corresponding normalized patent document, extracts additional chemical entities, assigns a confidence score to each additional chemical entity, and labels each additional chemical entity as relevant or irrelevant to an associated patent document based on information contained in the chemical patent corpus.

14 Claims, 11 Drawing Sheets

(56) References Cited

U.S. PATENT DOCUMENTS

| | | | |
|---|---|---|---|
| 7,933,763 | B2 | 4/2011 | Lawson et al. |
| 9,092,545 | B2 | 7/2015 | Rivette et al. |
| 10,572,545 | B2 * | 2/2020 | Oh ............... G06F 16/3334 |
| 2002/0077757 | A1 | 6/2002 | Bunin et al. |
| 2005/0010603 | A1 | 1/2005 | Berks |
| 2005/0203898 | A1 | 9/2005 | Boyer et al. |
| 2005/0246316 | A1 * | 11/2005 | Lawson ............... G16C 20/70 |
| 2007/0016612 | A1 | 1/2007 | James et al. |
| 2007/0260583 | A1 | 11/2007 | Domine et al. |
| 2008/0004810 | A1 | 1/2008 | Boyer et al. |
| 2009/0132464 | A1 | 5/2009 | Fliri et al. |
| 2011/0055233 | A1 * | 3/2011 | Weber ............... G06F 16/90344 707/769 |
| 2013/0308840 | A1 | 11/2013 | Tallapragada et al. |
| 2014/0372448 | A1 * | 12/2014 | Olson ............... G16C 20/40 707/741 |
| 2015/0220680 | A1 | 8/2015 | Boyer et al. |
| 2018/0046604 | A1 | 2/2018 | Kossarian |
| 2018/0082197 | A1 * | 3/2018 | Aravamudan ......... G06N 5/022 |
| 2019/0213407 | A1 * | 7/2019 | Toivanen ............ G06N 3/0445 |

OTHER PUBLICATIONS

Akhondi et al. (2014) Annotated Chemical Patent Corpus: A Gold Standard for Text Mining. PLoS ONE 9(9): e107477. doi: 10.1371/journal.pone.0107477. 14 pages (Year: 2014).*

Zhang et al. Chemical named entity recognition in patents by domain knowledge and unsupervised feature learning. Database (2016) vol. 2016: article ID baw049; doi:10.1093/database/baw049. 10 pages (Year: 2016).*

Akhondi et al. Recognition of chemical entities: combining dictionary-based and grammar-based approaches Journal of Cheminformatics 2015, 7(Suppl 1):S10 [http://www.jcheminf.com/content/7/S1/S10]. 11 pages (Year: 2015).*

Jessop, David M. Information Extraction from Chemical Patents. Dissertation for Fitzwilliam College. Published Mar. 15, 2011. Retrieved via Semantic Scholar from [https://www.repository.cam.ac.uk/handle/1810/238302] on [May 5, 2022]. 243 pages. (Year: 2011).*

Bobach et al. Automated compound classification using a chemical ontology. Journal of Cheminformatics 2012, 4:40 [http://www.jcheminf.com/content/4/1/40]. 12 pages. (Year: 2012).*

Irmer et al. (2015) OCMiner for patents, extracting chemical information from patent texts. In: Proceedings of the Fifth BioCreative Challenge Evaluation Workshop, pp. 119-123. Retrieved from [https://biocreative.bioinformatics.udel.ed] on [Apr. 21, 2022]. 5 pages. (Year: 2015).*

Tsai et al. NERChem: adapting NERBio to chemical patents via full-token features and named entity feature with chemical sub-class composition. Database (2016) vol. 2016: article ID baw135; doi:10.1093/database/baw135. 8 pages. (Year: 2016).*

International Search Report and Written Opinion dated Jun. 11, 2019 for PCT/US2019/020907 filed Mar. 6, 2019.

* cited by examiner

METHODS, SYSTEMS, AND STORAGE MEDIA FOR AUTOMATICALLY IDENTIFYING RELEVANT CHEMICAL COMPOUNDS IN PATENT DOCUMENTS

CROSS-REFERENCE TO RELATED APPLICATIONS

The present application claims priority to International Application No. PCT/US2019/020907 entitled "Methods, Systems, and Storage Media for Automatically Identifying Relevant Chemical Compounds in Patent Documents" filed on Mar. 6, 2019, which claims priority to U.S. Provisional Patent Application No. 62/639,656, filed Mar. 7, 2018 and entitled "Automatic Identification of Relevant Chemical Compounds from Patent," the contents of which are both incorporated herein by reference in its entirety.

TECHNICAL FIELD

The present disclosure relates to methods, systems, and storage media for automatically identifying chemical compounds in patent documents, and more specifically, for training a chemical entity recognition system to automatically extract chemical compounds from patent documents and classify the chemical compounds' relevance with respect to the corresponding patent documents.

BACKGROUND ART

Chemistry-related publications may include patent applications and scientific journal articles. In commercial research and development projects, an initial public disclosure of new chemical compounds may take place in patent applications. On occasion, it may takes an additional 1 to 3 years for these chemical compounds to appear in journal publications. Therefore, these chemical compounds may only be available through patent documents for a period of time. Additionally, chemical patent documents may contain unique information such as reactions, experimental conditions, mode of action, bioactivity data, and catalysts. Analyzing such information may be necessary as it allows the understanding of compound prior art, it provides a means for novelty checking and validation, and it points to starting points for chemical research in academia and industry.

SUMMARY

One aspect of the present disclosure relates to a method of training a chemical entity recognition system to extract one or more chemical compounds from a patent document and determine a relevance of the one or more chemical compounds to the patent document. The method includes obtaining, by a processing device, a plurality of patent documents from one or more patent databases. The method further includes normalizing, by the processing device, each patent document of the plurality of patent documents into a unified format to achieve a plurality of unified patent documents. The method further includes generating, by the processing device, a chemical patent corpus from the plurality of unified patent documents. The chemical patent corpus includes one or more chemical entities extracted from the plurality of unified patent document. Each of the one or more chemical entities includes one or more relevancy annotations. The one or more relevancy annotations indicates a relevance to the patent document from which the chemical entity is extracted. The method further includes providing, by the processing device, the chemical patent corpus to the chemical entity recognition system. The chemical entity recognition system, in response to receiving the chemical patent corpus, tags the one or more chemical entities in a corresponding normalized patent document of the plurality of unified patent documents, extracts one or more additional chemical entities from the plurality of unified patent documents, assigns a confidence score to each of the one or more additional chemical entities, and labels each of the one or more additional chemical entities as relevant or irrelevant to an associated patent document based on information contained in the chemical patent corpus.

Another aspect of the present disclosure relates to a system configured for training a chemical entity recognition system to extract one or more chemical compounds from a patent document and determine a relevance of the one or more chemical compounds to the patent document. The system includes one or more hardware processors and a non-transitory, processor-readable storage medium comprising one or more programming instructions thereon. The programming instructions, when executed, cause the one or more hardware processors to obtain a plurality of patent documents from one or more patent databases. The programming instructions, when executed, cause the one or more hardware processors to normalize each patent document of the plurality of patent documents into a unified format to achieve a plurality of unified patent documents. The programming instructions, when executed, cause the one or more hardware processors to generate a chemical patent corpus from the plurality of unified patent documents. The chemical patent corpus includes one or more chemical entities extracted from the plurality of unified patent document. Each of the one or more chemical entities includes one or more relevancy annotations. The one or more relevancy annotations indicate a relevance to the patent document from which the chemical entity is extracted. The programming instructions, when executed, cause the one or more hardware processors to provide the chemical patent corpus to the chemical entity recognition system. The chemical entity recognition system tags the one or more chemical entities in a corresponding normalized patent document of the plurality of unified patent documents, extracts one or more additional chemical entities from the plurality of unified patent documents, assigns a confidence score to each of the one or more additional chemical entities, and labels each of the one or more additional chemical entities as relevant or irrelevant to an associated patent document based on information contained in the chemical patent corpus.

Yet another aspect of the present disclosure relates to a non-transitory storage medium having executable instructions embodied thereon for causing a processing device to obtain a plurality of patent documents from one or more patent databases, normalize each patent document of the plurality of patent documents into a unified format to achieve a plurality of unified patent documents, and generate a chemical patent corpus from the plurality of unified patent documents. The chemical patent corpus includes one or more chemical entities extracted from the plurality of unified patent document. Each of the one or more chemical entities includes one or more relevancy annotations. The one or more relevancy annotations indicate a relevance to the patent document from which the chemical entity is extracted. The executable instructions further cause the processing device to provide the chemical patent corpus to the chemical entity recognition system. The chemical entity recognition system tags the one or more chemical entities in a corresponding normalized patent document of the plurality of unified patent documents, extracts one or more additional chemical entities from the plurality of unified patent documents, assigns a confidence score to each of the one or more additional chemical entities, and labels each of the one or more additional chemical entities as relevant or irrelevant to an associated patent document based on information contained in the chemical patent corpus.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DESCRIPTION OF EMBODIMENTS

Figure 1:
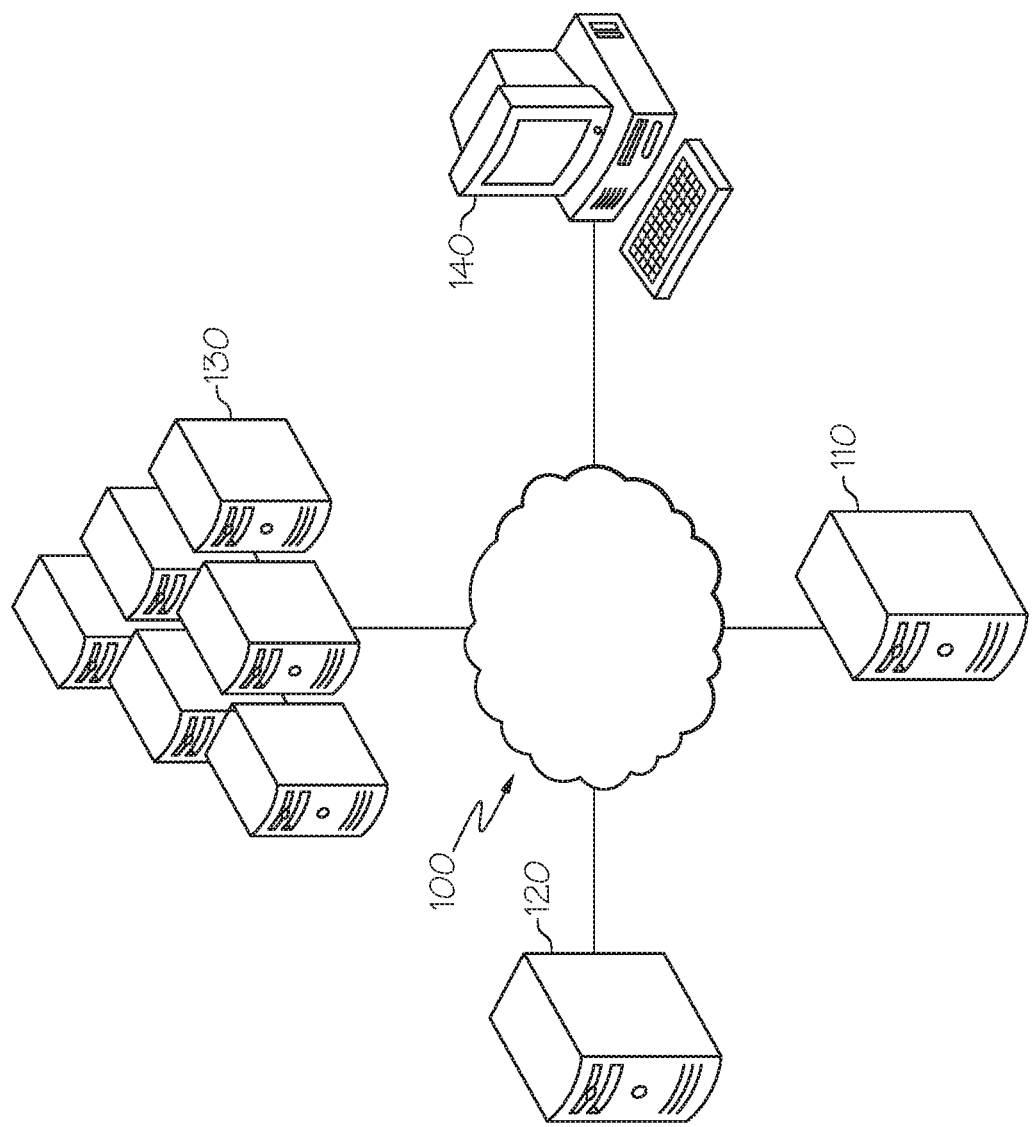
FIG. 1 schematically depicts an illustrative network for a system for training a chemical entity recognition system to automatically extract chemical compounds from patent documents and determine a relevance of the chemical compounds to the patent documents according to one or more embodiments shown and described herein.

The present disclosure generally relates to a system that automatically extracts chemical compounds from a patent document and determines the chemical compound's relevance to that patent document. The processes described herein relate to a training device that is particularly configured to pull patent documents from a database, normalize the patent documents, and feed the patent documents to a machine learning system (referred to herein as a chemical entity recognition system) such that the machine learning system, once trained, can automatically recognize chemical compounds within the normalized patent documents and determine whether the chemical compounds are relevant or irrelevant to the associated patent documents.

Patent data contained within patent documents can be obtained from various patent databases, including, but not limited to, databases maintained by various patent offices such as the European Patent Office (EPO), the United States Patent and Trademark Office (USPTO), the World Intellectual Property Organization (WIPO), the Japan Patent Office (JPO) the State Intellectual Property Office (SIPO) of China, and the African Regional Intellectual Property Organization (ARIPO). In some embodiments, patent databases may be maintained by non-governmental entities, such as for example, Google. The information contained within databases maintained by non-governmental entities may be a copy of information contained in various patent office databases. Accordingly, the term "patent database" as used herein generally refers to any database that contains patent documents or patent data, including (but not limited to) the databases noted hereinabove.

Depending on the patent authority, the data that is made available may be in one or more formats, including, but not limited to, of XML, HTML, text PDF, Optical Character Recognition (OCR) PDF, image PDF, and the like. Patent documents may follow a systematic structure consisting of title, bibliographic information (e.g., patent number, dates, inventor name(s), assignee(s), applicant(s), and International Patent Classification (IPC) classes), abstract, description, and claims. In some embodiments, the chemical data contained within a patent document may be available in an experimental section of the description, while chemical compounds that are claimed (i.e. protected by the patent) may be available in the claim section. Drawings, sequences, or other additional information containing chemical data may be found at the very end of the patent document (e.g., after a claims listing and an abstract).

While patent authorities make available the patent documents, they do not provide systematic continuous chemical annotations and full-text searching capabilities, so manual or automatic excerption processes may be considered. Manual excerption processes are costly and time consuming, and may therefore be limited to commercial content providers, such as, for example, Elsevier Reaxys (Elsevier B. V., Amsterdam NL). Automatic approaches to extract information from patents may extract images and attachment files, but the extracted information may only be derived by text mining and image mining, may only be available for certain patent documents published after a certain date (e.g., information from digital chemical structure files provided by the USPTO for a subset of its patents (granted patents from 2001 until 2011)). However, it proves difficult to maintain public databases and many of the automatic approaches have thus become outdated. Furthermore, such automatic approaches have limitations in the interpretation of individual drawing features (such as chemical bonds) found in the structure diagrams of some images. Further, automatic approaches that utilize text-mining focus on the recognition of chemical compounds in patents, which is limited by the compounds contained in a dictionary. Addition of all systematic compound identifiers to a dictionary is impossible as they are algorithmically generated based on the structure of a compound and a set of rules. Furthermore, correctness of the associated chemical structure to a recognized compound is essential in the field of chemistry. Often, a combination of the methods above in the form of an ensemble system is used for chemical compound recognition, which requires a gold-standard corpus for training, developing, and testing performance. Producing such a corpus is laborious and expensive. It involves development of well-defined annotation guidelines, selection and training of domain experts for annotation, selection of the data, annotation of the data by multiple annotators, and harmonization of the annotations.

Extracting information from patents automatically is fast but has limitations. The majority of patent text-mining systems have been developed, trained, and tested using the title and abstract of the patent documents. Therefore, their usage is not evaluated on full-text documents. More importantly, automatic extraction is mostly focused on extraction of all chemical compounds mentioned. In manually excerpted databases, the focus is on relevant compounds. A compound is relevant to a patent when it plays a major role within the patent application (e.g. starting material or a product in a reaction specified in the claim section). Relevant compounds are a small fraction of all the compounds mentioned within the patent document. Automatic identification of the relevant compounds would greatly reduce the amount of extracted data from patents and can improve the usefulness of patent resources. Furthermore, these compounds can be used in predictive analyses to identify the key compounds within the patent (key compounds are the main compounds protected by the patent application and are usually well-hidden within the context).

Accordingly, the systems, methods, and media of the present disclosure identify relevant chemical compounds in patent documents using an automatic approach that determines whether a chemical entity is relevant or irrelevant to the patent document in which it is contained, which minimizes the size of the database that is maintained to catalog the ever-increasing amount of patent documents available, which allows the database to be searched more efficiently, allows searching to return more relevant results, and is less costly to maintain. Other advantages may also be realized.

As used herein, the term "patent document" generally refers to any patent related publication, including, but not limited to, published patents (including utility patents, design patents, and plant patents), published patent applications, published utility models, published innovation patents, published utility certificates, published petty patents, published short term patents, published utility innovations, published functional designs, published utility certificates, and the like. In some embodiments, a patent document may be a chemistry related patent document containing chemical information therein. That is, a chemistry related patent document may include, but is not limited to, one or more chemical symbols, one or more functional groups, an identification of one or more chemical classes, an identification of one or more chemical formulas, an identification of one or more chemical structural formulae, identification of one or more chemical prefixes, identification of one or more chemical suffixes, identification of one or more chemical properties, any chemical nomenclature and/or terminology promulgated by the International Union of Pure and Applied Chemistry (IUPAC), and/or the like.

Referring now to the figures, FIG. 1 schematically depicts an illustrative network for a system for training a chemical entity recognition system to automatically extract chemical compounds from patent documents and determine a relevance of the chemical compounds to the patent documents according to various embodiments. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a training device 110, a chemical entity recognition system 120, one or more data repositories 130, and/or a user computing device 140.

The training device 110 may generally be configured to train the chemical entity recognition system 120 and may further be configured to transmit and/or receive electronic data and/or the like from one or more sources (e.g., the chemical entity recognition system 120, the one or more data repositories 130, and/or the user computing device 140), direct operation of one or more other devices (e.g., the chemical entity recognition system 120, the one or more data repositories 130, and/or the user computing device 140), collect data from one or more sources (e.g., patent document data, particularly chemical patent document data from the one or more data repositories 130 or the like), store data relating to chemical entities located within patent documents, associated patent documents, data pertaining to relevance of a chemical entity in a patent document, and/or the like. Additional details regarding the training device 110 are described herein. In some embodiments, the training device 110 may be able to communicate with one or more other devices according to a client/server architecture and/or other architectures.

The chemical entity recognition system 120 is generally a machine learning (ML) server that is particularly configured to receive data pertaining to chemical patent documents, analyze the data and extract chemical entities therefrom, and determine whether the extracted chemical entities are relevant to the chemical patent documents from which they were extracted. The chemical entity recognition system 120 may continuously receive data and/or instructions from one or more other devices of the computer network 100, including, but not limited to, the training device 110, the one or more data repositories 130, and/or the user computing device 140. Additional details regarding the chemical entity recognition system 120 are described herein.

The one or more data repositories 130 may generally store data that is used for the purposes of extracting chemical entities and determining relevance thereof, as described herein. That is, the one or more data repositories 130 may contain patent documents, particularly chemical patent documents. In some embodiments, the data contained within the one or more data repositories 130 may be third party servers that contain information that can be used for the purposes of providing a dynamically ranked recommendation list, which are accessible via an application programming interface (API) or the like by the training device 110, the chemical entity recognition system 120, and/or the user computing device 140. For example, the one or more data repositories 130 may include one or more repositories maintained by a patent office, such as, for example, the USPTO, the EPO, the SIPO, the JPO, WIPO, and ARIPO. In some embodiments, data may be directly obtained from the one or more data repositories 130 automatically and continuously for the purposes of carrying out the processes described herein. In other embodiments, data may be copied from the one or more data repositories 130 to the training device 110 and/or the chemical entity recognition system 120 for the purposes of carrying out the processes described herein.

The user computing device 140 may each generally be used as an interface between a user and the other components connected to the computer network 100, and/or various other components communicatively coupled to the user computing device 140 (such as components communicatively coupled via one or more networks to the user computing device 140), whether or not specifically described herein. Thus, the user computing device 140 may be used to perform one or more user-facing functions, such as receiving one or more inputs from a user or providing information to the user. For example, the user computing device 140 may receive user inputs that correspond to researching patent documents (including chemical patent documents), researching chemical information, researching chemical entities, providing information, conducting various searches, and/or the like. Additionally, in the event that the training device 110 and/or the chemical entity recognition system 120 require oversight, updating, or correction, the user computing device 140 may be configured to provide the desired oversight, updating, and/or correction. The user computing device 140 may also be used to input additional data into a data storage portion of the training device 110, the chemical entity recognition system 120, and/or the one or more data repositories 130. For example, a user may use the user computing device 140 to upload a patent publication to one or more components connected via the computer network 100. In some embodiments, the user computing device 140 may be configured to communicate with other platforms via a server and/or according to a peer-to-peer architecture and/or other architectures.

It should be understood that while the user computing device 140 is depicted as a personal computer and the training device 110, the chemical entity recognition system 120, and the one or more data repositories 130 are depicted as servers, these are nonlimiting examples. More specifically, in some embodiments, any type of computing device (e.g., mobile computing device, personal computer, server, etc.) or any specialized device that has computing components may be used for any of these components. Additionally, while each of the devices is illustrated in FIG. 1 as a single piece of hardware, this is also merely an example. More specifically, each of the training device 110, the chemical entity recognition system 120, the one or more data repositories 130, and the user computing device 140 may represent a plurality of computers, servers, databases, mobile devices, components, specialized devices, and/or the like. Similarly, the one or more data repositories 130 may be a single computer, server, database, mobile device, component, specialized device, and/or the like.

Figure 2A:
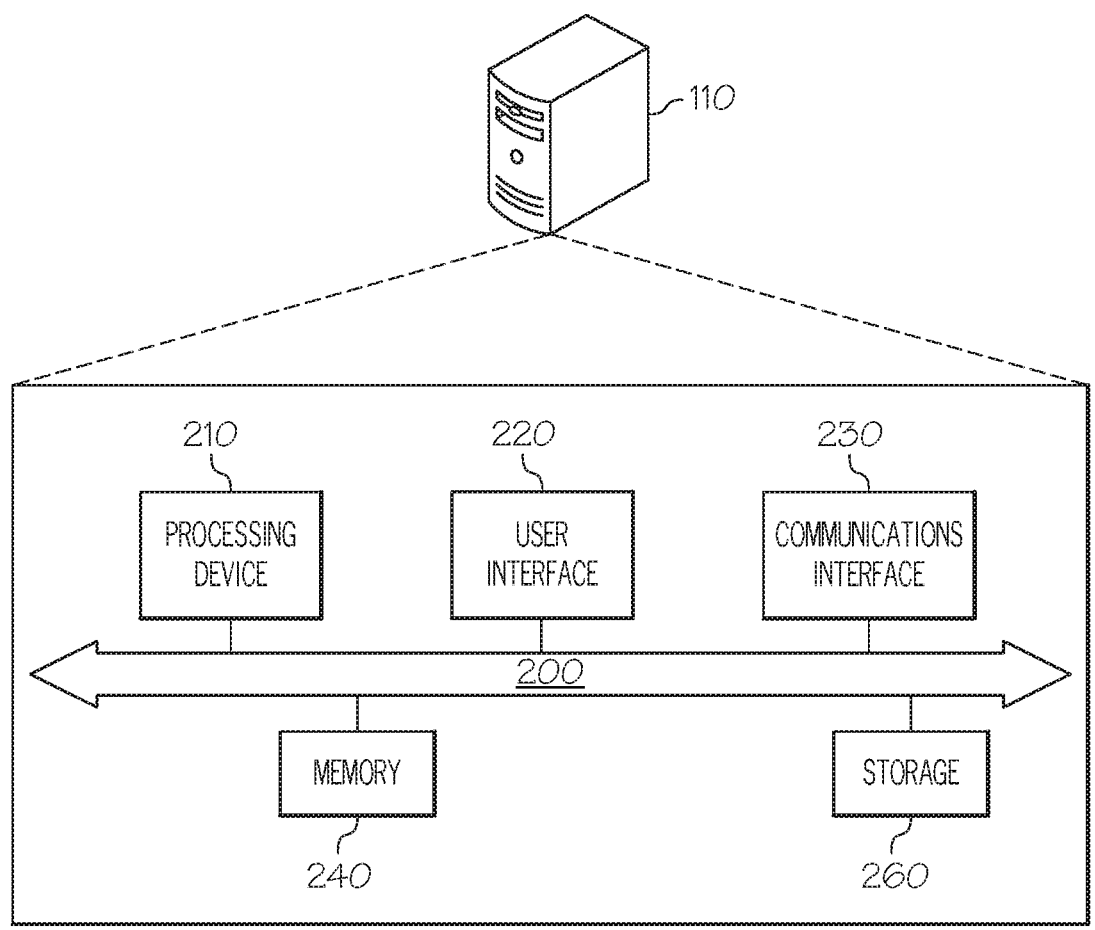
FIG. 2A depicts a block diagram of illustrative internal components of a training device configured to train a chemical entity recognition system to automatically extract chemical compounds from patent documents and determine a relevance of the chemical compounds to the patent documents according to one or more embodiments shown and described herein.

Illustrative hardware components of the training device 110 are depicted in FIG. 2A. A bus 200 may interconnect the various components, which include (but are not limited to) a processing device 210, user interface hardware 220, communications interface hardware 230, memory 240, and/or a storage device 260. The processing device 210, such as a computer processing unit (CPU), may be the central processing unit of the training device 110, performing calculations and logic operations required to execute a program. The processing device 210, alone or in conjunction with one or more of the other elements disclosed in FIG. 2A, is an illustrative processing device, computing device, processor, or combination thereof, as such terms are used within this disclosure. The memory 240, such as read only memory (ROM) and random access memory (RAM), may constitute an illustrative memory device (i.e., a non-transitory processor-readable storage medium). Such memory 240 may include one or more programming instructions thereon that, when executed by the processing device 210, cause the processing device 210 to complete various processes, such as the processes described herein. In some embodiments, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

In some embodiments, the program instructions contained on the memory 240 may be embodied as a plurality of software logic modules, where each logic module provides programming instructions for completing one or more tasks. For example, certain software logic modules may be used for the purposes of collecting information (e.g., information contained within patent documents, particularly chemical patent documents), extracting information (e.g., chemical entities from chemical patent documents), providing information (e.g., transmitting information to the chemical entity recognition system 120 (FIG. 1)), and/or the like. Additional details regarding the logic modules will be discussed herein with respect to FIG. 2B.

Still referring to FIG. 2A, the storage device 260, which may generally be a storage medium that is separate from the memory 240, may contain one or more data repositories for storing data pertaining to patent documents, particularly chemical patent documents, data pertaining to chemical entities, data pertaining to whether a chemical entity is relevant an associated patent document, data that is transmitted to the chemical entity recognition system 120 (FIG. 1) for the purposes of training the chemical entity recognition system 120, data pertaining to annotations, and/or the like. Still referring to FIG. 2A, the storage device 260 may be any physical storage medium, including, but not limited to, a hard disk drive (HDD), memory, removable storage, and/or the like. While the storage device 260 is depicted as a local device, it should be understood that the storage device 260 may be a remote storage device, such as, for example, a server computing device, the one or more data repositories 130 (FIG. 1) or the like. Additional details regarding the types of data stored within the storage device 260 are described with respect to FIG. 2C.

Still referring to FIG. 2A, the user interface hardware 220 may permit information from the bus 200 to be provided to a user, whether the user is local to the training device 110 or remote from the training device 110 (e.g., a user of the user computing device 140 (FIG. 1)). Still referring to FIG. 2A, the user interface hardware 220 may incorporate a display and/or one or more input devices such that information is displayed on the display in audio, visual, graphic, or alphanumeric format and/or receive inputs. Illustrative input devices include, but are not limited to, a keyboard, a mouse, a joystick, a touch screen, a remote control, a pointing device, a video input device, an audio input device, a haptic feedback device, and/or the like.

Referring to FIGS. 1 and 2A, the communications interface hardware 230 may generally provide the training device 110 with an ability to interface with one or more components of the computer network 100. For example, the training device may communicate with components of the computer network 100 via the communications interface hardware 230, including, but not limited to, the chemical entity recognition system 120, the one or more data repositories 130, and/or the user computing device 140. Communication with external devices may occur using various communication ports (not shown). An illustrative communication port may be attached to a communications network, such as the Internet, an intranet, a local network, a direct connection, and/or the like.

It should be understood that the components illustrated in FIG. 2A are merely illustrative and are not intended to limit the scope of this disclosure. More specifically, while the components in FIG. 2A are illustrated as residing within the training device 110, this is a nonlimiting example. In some embodiments, one or more of the components may reside external to the training device 110, either within one or more of the components described with respect to FIG. 1, other components, or as standalone components. Similarly, one or more of the components may be embodied in other computing devices not specifically described herein. In addition, while the components in FIG. 2A relate particularly to the training device 110, this is also a nonlimiting example. That is, similar components may be located within other components without departing from the scope of the present disclosure.

Figure 2B:
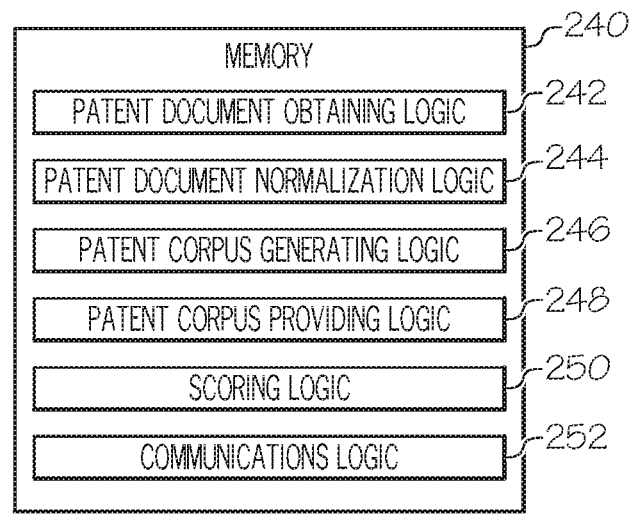
FIG. 2B depicts a block diagram of illustrative logic modules located within a memory of a training device that is configured to train a chemical entity recognition system to automatically extract chemical compounds from patent documents and determine a relevance of the chemical compounds to the patent documents according to one or more embodiments shown and described herein.

Referring now to FIG. 2B, illustrative logic modules that may be contained within the memory 240 of the training device 110 (FIG. 2A) are depicted. Still referring to FIG. 2B, the logic modules may include, but are not limited to, patent document obtaining logic 242, patent document normalization logic 244, patent corpus generating logic 246, patent document obtaining logic 248, scoring logic 250, and/or communications logic 252.

The patent document obtaining logic 242 generally contains programming instructions for obtaining patent documents. That is, the patent document obtaining logic 242 may include programming for causing the processing device 210 (FIG. 2A) to access one or more data storage components (e.g., the storage device 260 (FIG. 2A), the one or more data repositories 130 (FIG. 1), and/or the like) and obtain patent documents, particularly chemical patent documents, therefrom. As such, the patent document obtaining logic 242 may include programming instructions that allow for a connection between devices to be established, protocol for requesting data stores containing data, instructions for causing the data to be copied, moved, or read, and/or the like. Accordingly, as a result of operating according to the patent document obtaining logic 242, data and information pertaining to patent documents, particularly chemical patent documents, is available for completing various other processes, as described in greater detail herein.

The patent document normalization logic 244 generally contains programming instructions for normalizing patent documents that have been obtained from a plurality of sources. That is, the patent document normalization logic 244 contains programming instructions that cause information from patent documents, particularly chemical patent documents to be written in a unified format for later access, thereby resulting in a plurality of unified patent documents. Such a unified format should be generally understood to be a format that is common to all of the patent documents, similar to a unidiff that is commonly used in computing data comparison. Thus, the plurality of unified patent documents refers to a plurality of patent documents that have been modified to comply with the unified format. By way of non-limiting example, normalizing each patent document may include converting the plurality of patent documents into a unified xml representation format, utilizing one or more predefined xml tags corresponding to heuristic information within the plurality of patent documents. It should be understood that predefined XML tags generally refer to custom tags that define particular portions of a patent document that may be called different things in different countries or even from patent to patent in the same database so that any object or section tagged with the custom tag will be read according to the custom tag. For example, a particular body of text may be referred to as a "detailed description" in one patent document, a "detailed disclosure of the embodiments" in another patent document, and a "disclosure" in a third patent document. The predefined XML tags may be set that all three of these bodies of text are recognized as being the same thing when read later on, as described herein. As used herein, the term "heuristic information" refers to a statistic value associated with a particular portion of a patent document that represents the relative suitability of the portion among its peers based on intuition, previous experience, common sense, and/or the like, which may be developed, for example, based on machine learning.

The patent corpus generating logic 246 generally contains programming instructions for generating a corpus from the normalized documents that are produced as a result of operating according to the patent document normalization logic 244. That is, the generated normalized documents are collected into a corpus according to the patent corpus generating logic 246. In some embodiments, the corpus is further stored in a data repository in accordance with the programming instructions provided by the patent corpus generating logic 246. In still further embodiments, the data may be stored separately from the data containing the patent documents and/or the data containing the normalized documents.

In some embodiments, the patent corpus generating logic 246 may further contain programming instructions for generating a chemical patent corpus from the plurality of unified/normalized patent documents. A chemical patent corpus is generally a corpus of unified/normalized documents (or data extracted from documents that have been unified/normalized) that contain one or more chemical entities therein. In some embodiments, all of the unified/normalized documents may have chemical entities therein, and thus all may be included within the chemical patent corpus. Generating the chemical patent corpus may include, for example, identifying a chemical compound within text contained in each patent document of the plurality of normalized/unified patent documents. Generating the chemical patent corpus may also include accessing a physical properties database and obtaining one or more physical properties of the identified chemical compound. It should be understood that a physical properties database is generally a database that contains data matching particular compounds to particular physical properties. For example the compound $H_2O$ may be contained within the physical properties database along with corresponding data relating to the physical properties of water. Generating the chemical patent corpus may also include generating a chemical structure corresponding to the chemical compound based on the one or more physical properties. Identifying the chemical compound may include utilizing a dictionary-based approach and/or a morphology-based approach to identify the chemical compound.

The morphology-based approach may include identifying one or more elements within the chemical compound and combining the one or more elements to create the chemical compound if the chemical compound is validated based on a structural chemistry of the chemical compound. By way of non-limiting example, generating the chemical patent corpus from the plurality of normalized/unified patent documents may include annotating each of the plurality of unified patent documents with one or more of a chemical compound, a compound class, a suffix of a chemical compound, and a prefix of a chemical compound.

It should be understood that a chemical compound is a chemical substance composed of chemical elements held together by chemical bonds, including molecules (or molecular entities) held together by chemical bonds. Chemical compounds may be molecules held together by covalent bonds, ionic compounds held together by ionic bonds, intermetallic compounds held together by metallic bonds, or complexes held together by coordinate covalent bonds. Chemical compounds may be expressed by a chemical formula. By way of non-limiting example, the chemical compound may be selected from a mono-component compound, a compound mixture part, or a prophetic compound. A mono-component compound may include pure chemical compounds such as, for example, systematic identifiers, trivial names, elements, and chemical formulas. A compound mixture part may be a portion of compound that has a particular percentage of components (e.g. 'Magnesiaflux', which scientifically is a mixture of 30% $MgF_2$ and 70% MgO). A prophetic compound is a specific compound that is uncharacterized within the text of a patent document and is mentioned in claims portion of a patent document or a description portion of a patent document only for intellectual property protection.

A compound class can generally be any grouping of compounds based on particular criteria. For example, chemical compounds may be classified according to the elements present in a compound (e.g., an oxide compound class may contain any chemical compound having one or more oxygen atoms, a hydride compound class may contain any chemical compound having one or more hydrogen atoms, a halide compound class may contain any chemical compound having one or more halogen atom, and an organic compound class may contain any chemical compound having a backbone of carbon atoms). In another example, chemical compounds may be classified according to the type of bonds that a compound contains (e.g., an ionic compound class contains compounds that are formed by attractive forces between oppositely charged ions such as salts, a molecular compound class contains compounds that are formed with covalent bonds). In yet another example, chemical compounds may be classified according to reactivity of a particular compound (e.g., an acid compound class contains compounds that produce hydrogen ions (protons or $H^+$ ions) when dissolved in water, a base compound class contains compounds that receive hydrogen ions when formed). A suffix of a chemical compound refers to the ending of the name of the chemical compound. By way of non-limiting example, the compound class may be selected from a chemical class, a biomolecule, a polymer, a mixture class, a mixture part class, or a Markush class. It should be understood that biomolecules are generally molecules and ions that are present in organisms, such as, but not limited to, proteins, carbohydrates, lipids, nucleic acids, metabolites, and/or the like. It should also be understood that a polymer is generally a substance that has a molecular structure consisting chiefly or entirely of a large number of similar units bonded together, such as, for example, synthetic organic materials used as plastics and resins. It should also be understood that a mixture class is a general class of mixture of materials, such as, for example, a solution, a suspension, a colloid, or the like. Similarly, a mixture part class refers to a class of parts that make up a mixture (e.g., compounds that made up a portion of a mixture). A Markush class generally refers to a class of compounds that are accepted as being in the same Markush group, such as compounds that have a single structural similarity, a common use, or the like.

In some embodiments, the patent corpus generating logic may contain programming instructions for grouping one or more chemical entities extracted from the plurality of normalized/unified patent documents into a particular corpus. It should be understood that the term "chemical entity" generally refers to a physical entity of interest in chemistry, which includes, but is not limited to, molecular entities, parts thereof, and chemical substances. Each of the one or more chemical entities may include one or more relevancy annotations. As described in greater detail herein, a relevancy annotation is a generated annotation as to whether a particular chemical entity is relevant to the patent document from which it was extracted. The one or more relevancy annotations may include a relevant compound indicated for a prophetic compound or a Markush class. By way of non-limiting example, the one or more relevancy annotations may include an irrelevant compound indicated for a compound mixture part, a mixture part class, a mixture class, a polymer, or a biomolecule. The one or more relevancy annotations for a mono-component compound or a chemical class may be assigned based on a context of the corresponding unified patent document. The one or more relevancy annotations may indicate a relevance to the patent document from which the chemical entity is extracted.

Referring to FIGS. 1 and 2B, the patent corpus providing logic 248 generally contains programming instructions for providing the patent corpus to another device in the computer network 100. For example, the patent corpus providing logic 248 may contain programming instructions that allow data pertaining to the patent corpus to be transmitted to the chemical entity recognition system 120, the one or more data repositories 130, and/or the user computing device 140.

The scoring logic 250 generally contains programming instructions for scoring each chemical entity contained within a patent corpus. That is, the scoring logic 250 contains programming instructions for assigning a relevance score, a confidence score, and/or the like to each chemical entity within the patent corpus in response to a score received from the chemical entity recognition system 120, as described in greater detail herein.

The communications logic 252 generally contains programming instructions for communicating with one or more of the devices in the computer network. For example, the communications logic 252 may contain communications protocol(s) for establishing a communications connection with the chemical entity recognition system 120, the one or more data repositories 130, and/or the user computing device 140 such that data and/or signals can be transmitted therebetween.

The logic modules depicted with respect to FIG. 2B are merely illustrative. As such, it should be understood that additional or fewer logic modules may also be included within the memory 240 without departing from the scope of the present disclosure. In addition, certain logic modules may be combined into a single logic module and/or certain logic modules may be divided into separate logic modules in some embodiments.

Figure 2C:
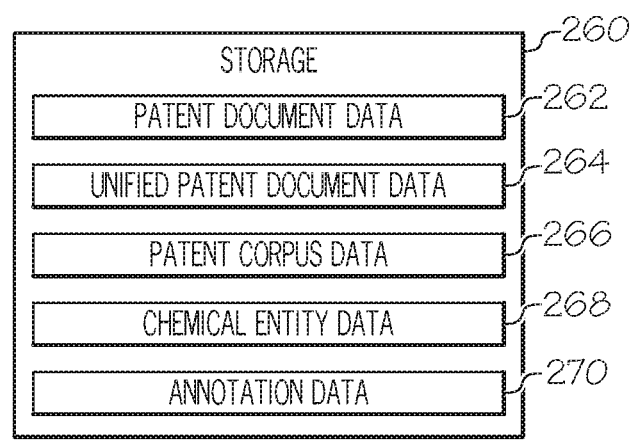
FIG. 2C depicts a block diagram of illustrative data components located within a storage device of a training device that is configured to train a chemical entity recognition system to automatically extract chemical compounds from patent documents and determine a relevance of the chemical compounds to the patent documents according to one or more embodiments shown and described herein.

Referring now to FIG. 2C, illustrative types of data that may be contained within the storage device 260 are depicted. The types of data may include, but are not limited to, patent document data 262, unified patent document data 264, patent corpus data 266, chemical entity data 268, and/or annotation data 270.

The patent document data 262 is generally data pertaining to patent documents, particularly chemical patent documents. In some embodiments, the data contained within the patent document data 262 may include full text documents received from one or more patent databases, such as the patent databases described herein.

The unified patent document data 264 is generally data pertaining to the unified patent documents that have been normalized as described herein. In some embodiments, the data contained within the unified patent document data 264 may include full text documents having annotations, an associated XML file, and/or the like that provides normalization information, as described in greater detail herein.

The patent corpus data 266 is generally the data that is generated as a result of creating a patent corpus, as described herein. In some embodiments, the patent corpus data 266 may be chemical patent corpus data.

The chemical entity data 268 may include data pertaining to one or more chemical entities extracted from the plurality of unified patent documents. That is, the chemical entity data 268 may identify each of the chemical entities located within each patent document of the patent corpus, may provide an associated structure, associated relevant names, associated categories, and/or the like.

The annotation data 270 generally includes data pertaining to annotations that are made with respect to the various chemical entities and/or patent documents within the patent corpus. For example, in some embodiments, each of the chemical entities may include one or more relevancy annotations that indicate a relevance to the patent document from which the chemical entity is extracted.

Figure 3A:
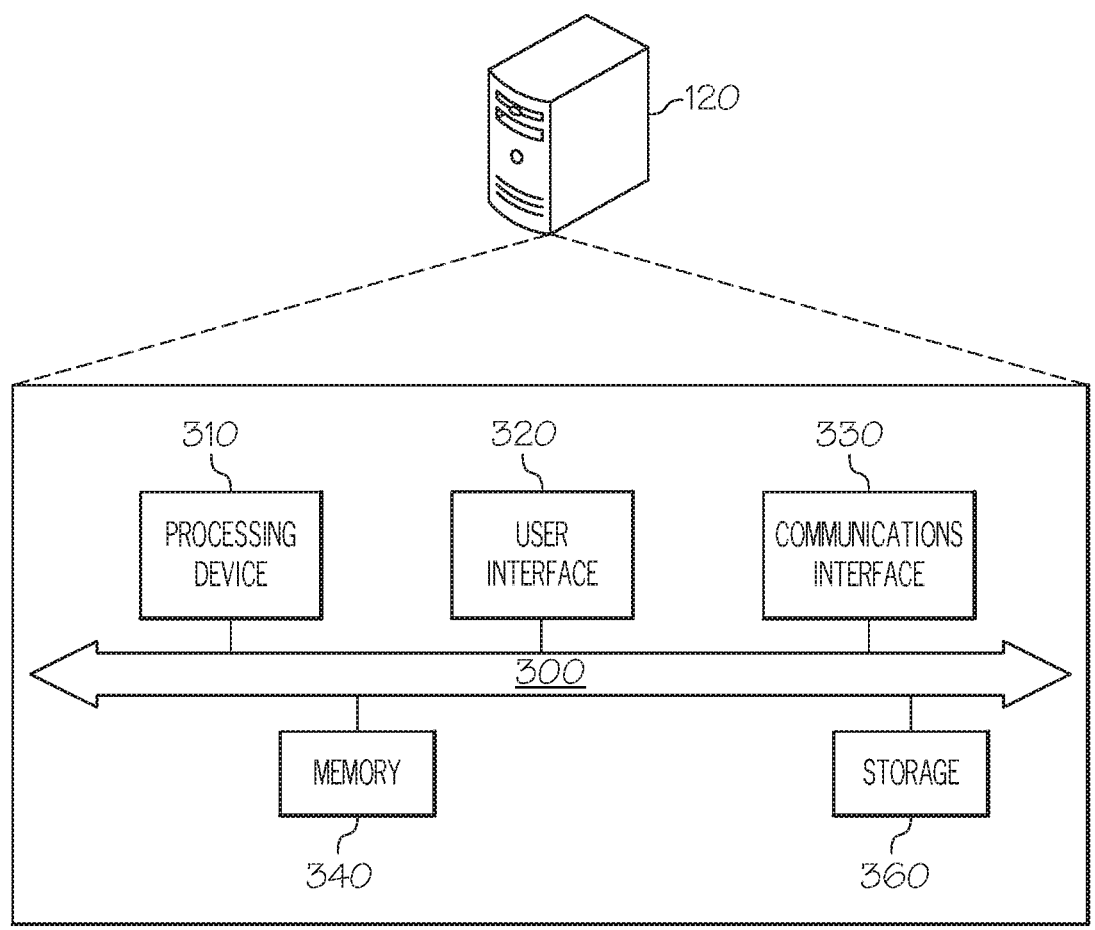
FIG. 3A depicts a block diagram of illustrative internal components of a chemical entity recognition system that is trained to automatically extract chemical compounds from patent documents and determine a relevance of the chemical compounds to the patent documents according to one or more embodiments shown and described herein.

Illustrative hardware components of the chemical entity recognition system 120 are depicted in FIG. 3A. A bus 300 may interconnect the various components, which include (but are not limited to) a processing device 310, user interface hardware 320, communications interface hardware 330, memory 340, and/or a storage device 360. The processing device 310, such as a computer processing unit (CPU), may be the central processing unit of the chemical entity recognition system 120, performing calculations and logic operations required to execute a program. The processing device 310, alone or in conjunction with one or more of the other elements disclosed in FIG. 3A, is an illustrative processing device, computing device, processor, or combination thereof, as such terms are used within this disclosure. The memory 340, such as read only memory (ROM) and random access memory (RAM), may constitute an illustrative memory device (i.e., a non-transitory processor-readable storage medium). Such memory 340 may include one or more programming instructions thereon that, when executed by the processing device 310, cause the processing device 310 to complete various processes, such as the processes described herein. In some embodiments, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

In some embodiments, the program instructions contained on the memory 340 may be embodied as a plurality of software logic modules, where each logic module provides programming instructions for completing one or more tasks. For example, certain software logic modules may be used for the purposes of collecting information (e.g., information contained within patent documents, particularly chemical patent documents), extracting information (e.g., chemical entities from chemical patent documents), providing information (e.g., transmitting information to the training device 110 (FIG. 1)), learning what particular types of information mean, and/or the like. Additional details regarding the logic modules will be discussed herein with respect to FIG. 3B.

Still referring to FIG. 3A, the storage device 360, which may generally be a storage medium that is separate from the memory 340, may contain one or more data repositories for storing data pertaining to patent documents, particularly chemical patent documents, data pertaining to chemical entities, data pertaining to whether a chemical entity is relevant an associated patent document, data that is transmitted to the training device 110 (FIG. 1), data pertaining to annotations, data pertaining to a confidence score, and/or the like. Still referring to FIG. 3A, the storage device 360 may be any physical storage medium, including, but not limited to, a hard disk drive (HDD), memory, removable storage, and/or the like. While the storage device 360 is depicted as a local device, it should be understood that the storage device 360 may be a remote storage device, such as, for example, a server computing device, the one or more data repositories 130 (FIG. 1) or the like. Additional details regarding the types of data stored within the storage device 360 are described with respect to FIG. 3C.

Still referring to FIG. 3A, the user interface hardware 320 may permit information from the bus 300 to be provided to a user, whether the user is local to the chemical entity recognition system 120 or remote from the chemical entity recognition system 120 (e.g., a user of the user computing device 140 (FIG. 1)). Still referring to FIG. 3A, the user interface hardware 320 may incorporate a display and/or one or more input devices such that information is displayed on the display in audio, visual, graphic, or alphanumeric format and/or receive inputs. Illustrative input devices include, but are not limited to, a keyboard, a mouse, a joystick, a touch screen, a remote control, a pointing device, a video input device, an audio input device, a haptic feedback device, and/or the like.

Referring to FIGS. 1 and 3A, the communications interface hardware 330 may generally provide the chemical entity recognition system 120 with an ability to interface with one or more components of the computer network 100. For example, the chemical entity recognition system 120 may communicate with components of the computer network 100 via the communications interface hardware 330, including, but not limited to, the training device 110, the one or more data repositories 130, and/or the user computing device 140. Communication with external devices may occur using various communication ports (not shown). An illustrative communication port may be attached to a communications network, such as the Internet, an intranet, a local network, a direct connection, and/or the like.

It should be understood that the components illustrated in FIG. 3A are merely illustrative and are not intended to limit the scope of this disclosure. More specifically, while the components in FIG. 3A are illustrated as residing within the chemical entity recognition system 120, this is a nonlimiting example. In some embodiments, one or more of the components may reside external to the chemical entity recognition system 120, either within one or more of the components described with respect to FIG. 1, other components, or as standalone components. Similarly, one or more of the components may be embodied in other computing devices not specifically described herein. In addition, while the components in FIG. 3A relate particularly to the chemical entity recognition system 120, this is also a nonlimiting example. That is, similar components may be located within other components without departing from the scope of the present disclosure.

Figure 3B:
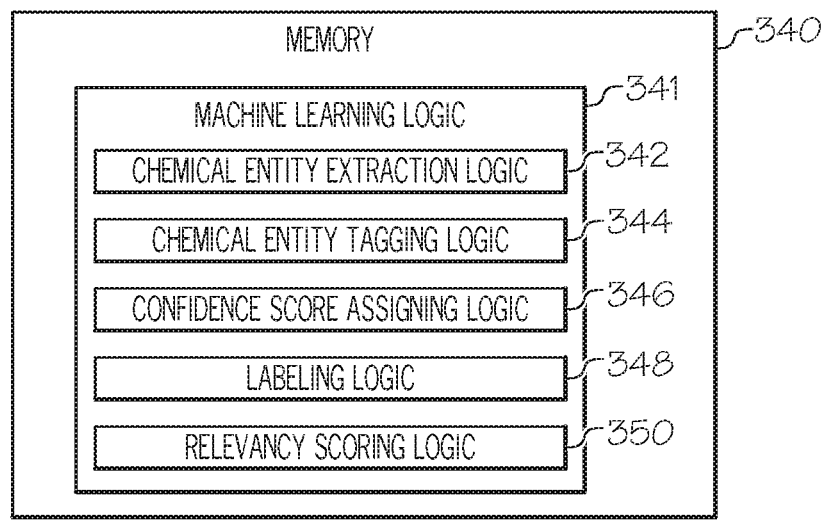
FIG. 3B depicts a block diagram of illustrative logic modules located within a memory of a chemical entity recognition system that is trained to automatically extract chemical compounds from patent documents and determine a relevance of the chemical compounds to the patent documents according to one or more embodiments shown and described herein.

Referring now to FIG. 3B, illustrative logic modules that may be contained within the memory 340 of the chemical entity recognition system 120 (FIG. 3A) are depicted. Still referring to FIG. 3B, the logic modules may generally be modules of a machine learning logic 341 module. Illustrative logic modules include, but are not limited to, chemical entity extraction logic 342, chemical entity tagging logic 344, confidence score assigning logic 346, labeling logic 348, and/or scoring logic 250.

The machine learning logic 341 may generally be a logic module that incorporates one or more machine learning algorithms therein. The machine learning algorithms contained within the machine learning logic 341 and utilized by the chemical entity recognition system 120 (FIG. 3A) are not limited by the present disclosure, and may generally be any algorithm now known or later developed, particularly those that are specifically adapted for generating a predictive model that can be used for determining a relevancy of a particular chemical entity to an associated chemical patent document. That is, the machine learning algorithms may be supervised learning algorithms, unsupervised learning algorithms, semi-supervised learning algorithms, and reinforcement learning algorithms. Specific examples of machine learning algorithms may include, but are not limited to, nearest neighbor algorithms, naïve Bayes algorithms, decision tree algorithms, linear regression algorithms, supervised vector machines, neural networks, clustering algorithms, association rule learning algorithms, Q-learning algorithms, temporal difference algorithms, and deep adversarial networks. Other specific examples of machine learning algorithms within the machine learning logic 341 should generally be understood and are included within the scope of the present disclosure.

A predictive model that is generated as a result of operation of the machine learning logic 341 is generally be any machine learning model now known or later developed, particularly one that provides resulting information that can be used to determine a relevance of a chemical entity to an associated chemical patent document. Illustrative examples of machine learning models include, but are not limited to, a convolutional neural network (CNN) model, a long short-term memory (LSTM) model, a neural network (NN) model, a dynamic time warping (DTW) model, or the like.

The chemical entity extraction logic 342 contained within the machine learning logic 341 generally contains programming instructions for extracting chemical entities from a chemical patent document. That is, the chemical entity extraction logic 342 may contain programming instructions for receiving a normalized/unified patent document from the corpus of patent documents, analyzing the document, and determining chemical entities contained within the document, as described in greater detail herein.

The chemical entity tagging logic 344 contained within the machine learning logic 341 may generally contain programming instructions for tagging, annotating, or otherwise marking normalized/unified patent documents with data pertaining to chemical entities extracted therefrom, as described in greater detail herein.

The confidence score assigning logic 346 contained within the machine learning logic 341 generally contains programming instructions for assigning a confidence score to each of the one or more chemical entities. The confidence score generally represents a level of confidence pertaining to whether a chemical entity is relevant or irrelevant to a particular document based on various factors, as described in greater detail herein.

The labeling logic 348 contained within the machine learning logic 341 generally contains programming instructions for labeling, marking, or otherwise indicating additional chemical entities within a patent document that may not have been indicated by the training device 110 (FIG. 1), as described in greater detail herein.

Still referring to FIG. 3B, the relevancy scoring logic 350 contained within the machine learning logic 341 generally contains programming instructions for determining a relevancy of a chemical entity to the document from which it was extracted, as described in greater detail herein.

The logic modules depicted with respect to FIG. 3B are merely illustrative. As such, it should be understood that additional or fewer logic modules may also be included within the memory 340 without departing from the scope of the present disclosure. In addition, certain logic modules may be combined into a single logic module and/or certain logic modules may be divided into separate logic modules in some embodiments.

Figure 3C:
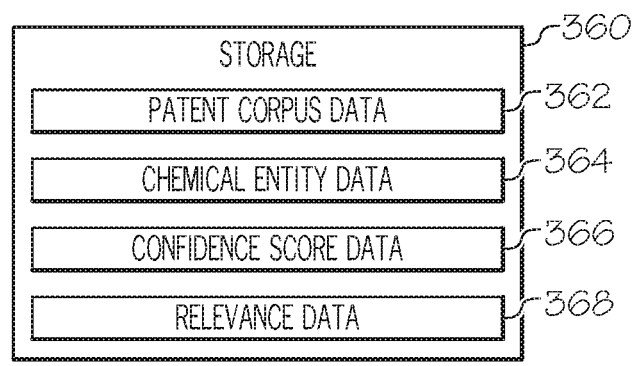
FIG. 3C depicts a block diagram of illustrative data components located within a storage device of a chemical entity recognition system that is trained to automatically extract chemical compounds from patent documents and determine a relevance of the chemical compounds to the patent documents according to one or more embodiments shown and described herein.

Referring now to FIG. 3C, illustrative types of data that may be contained within the storage device 360 are depicted. The types of data may include, but are not limited to, patent corpus data 362, chemical entity data 364, confidence score data 366, and/or relevance data 368.

The patent corpus data 362 is generally the data that is generated as a result of creating a patent corpus, as described herein. In some embodiments, the patent corpus data 362 may be chemical patent corpus data.

The chemical entity data 364 may include data pertaining to one or more chemical entities extracted from the plurality of unified patent documents, particularly additional entities extracted by the chemical entity recognition system 120 (FIG. 3A). That is, the chemical entity data 364 may be data that identifies each of the chemical entities located within each patent document of the patent corpus, may provide an associated structure, associated relevant names, associated categories, and/or the like.

The confidence score data 366 generally includes data pertaining to confidence scores determined by the chemical entity recognition system 120 (FIG. 3A). That is, the confidence score data 366 includes data that relates to a determined confidence that a chemical entity is relevant or irrelevant to the patent document from which it was extracted, as described in greater detail herein.

The relevance data 368 generally includes data that indicates a relevance of each chemical entity to a patent document from which the chemical entity was extracted. For example, the relevance data 368 may be a table or other similar data form that lists each of the chemical entities extracted in a particular patent document along with an associated indicator of relevance, as described in greater detail herein.

Figure 4:
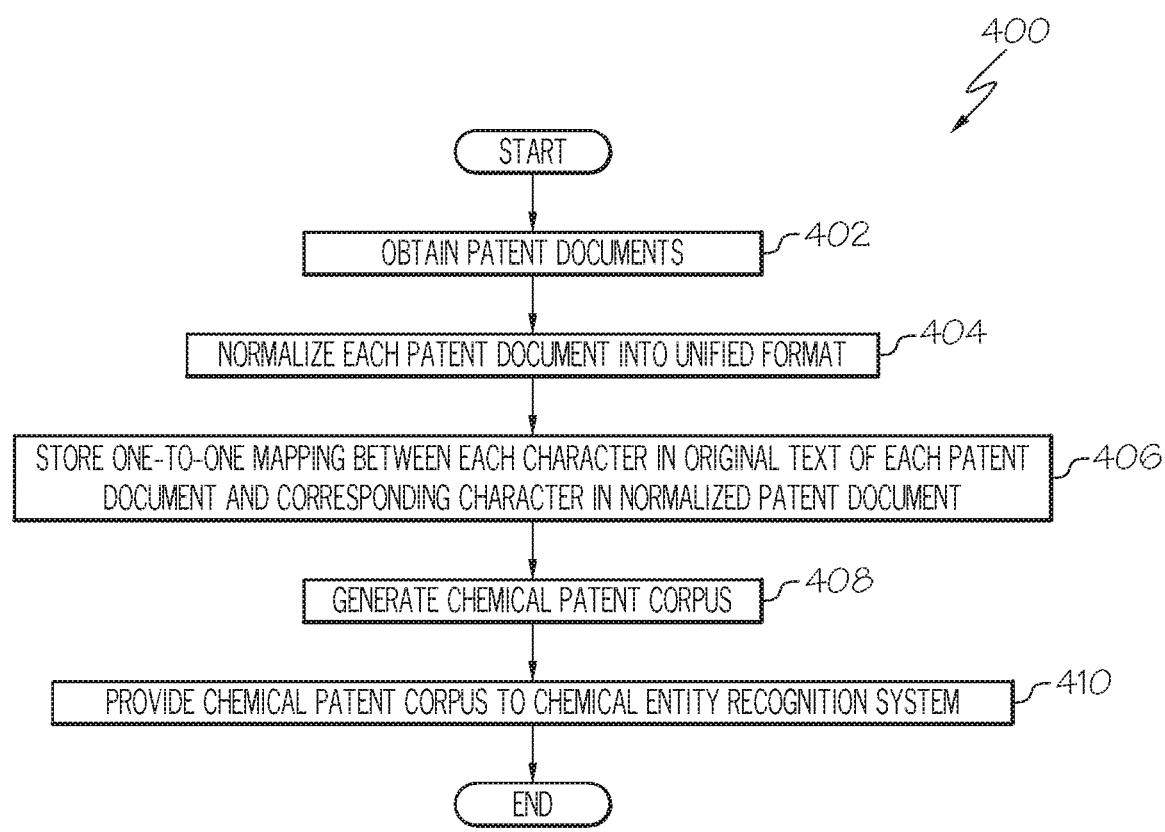
FIG. 4 depicts a flow diagram of an illustrative general method of training a chemical entity recognition system to automatically extract chemical compounds from patent documents and determine a relevance of the chemical compounds to the patent documents according to one or more embodiments shown and described herein.

FIG. 4 depicts a block diagram of an illustrative method 400 of training a chemical entity recognition system to automatically extract chemical compounds from patent documents and determine a relevance of the chemical compounds to the patent documents in accordance with one or more implementations. The operations of method 400 presented below are intended to be illustrative. In some implementations, the method 400 may be accomplished with one or more additional operations not described, and/or without one or more of the operations discussed. Additionally, the order in which the operations of method 400 are illustrated in FIG. 4 and described below is not intended to be limiting.

In some implementations, the method 400 may be implemented by one or more processing devices (e.g., a digital processor, an analog processor, a digital circuit designed to process information, an analog circuit designed to process information, a state machine, and/or other mechanisms for electronically processing information), such as the processing device 210 depicted and described herein with respect to FIG. 2A and/or the processing device 310 depicted and described herein with respect to FIG. 3A. Still referring to FIG. 4, the one or more processing devices may include one or more devices executing some or all of the operations of method 400 in response to instructions stored electronically on an electronic storage medium (e.g., the memory 240 depicted and described with respect to FIGS. 2A-2B and/or the memory 340 depicted and described with respect to FIGS. 3A-3B). The one or more processing devices may include one or more devices configured through hardware, firmware, and/or software to be specifically designed for execution of one or more of the operations of the method 400.

Referring to FIGS. 1-4, at block 402, a plurality of patent documents may be obtained. In some embodiments, the plurality of patent documents may be obtained from one or more patent databases, such as, for example, the one or more data repositories 130. Operation according to block 402 may be performed by one or more hardware processors configured by machine-readable instructions including logic that is the same as or similar to the patent document obtaining logic 242, in accordance with one or more implementations.

At block 404, each patent document of the plurality of patent documents may be normalized into a unified format to achieve a plurality of unified patent documents. Operation according to block 404 may be performed by one or more hardware processors configured by machine-readable instructions including logic that is the same as or similar to the patent document normalization logic 244, in accordance with one or more implementations.

At block 406, one-to-one mapping between each character in the original text of each patent document and the corresponding character in the normalized patent document may be stored. Operation according to block 406 may be performed by one or more hardware processors configured by machine-readable instructions including logic that is the same as or similar to the patent document normalization logic 244 and/or the scoring logic 250, in accordance with one or more implementations.

At block 408, a chemical patent corpus may be generated. In some embodiments, the chemical patent corpus may be generated from the plurality of unified patent documents. The chemical patent corpus may include one or more chemical entities extracted from the plurality of unified patent document. Each of the one or more chemical entities may include one or more relevancy annotations. The one or more relevancy annotations may indicate a relevance to the patent document from which the chemical entity is extracted. Operation according to block 408 may be performed by one or more hardware processors configured by machine-readable instructions including logic that is the same as or similar to patent corpus generating logic 246, in accordance with one or more implementations.

At block 410, the chemical patent corpus may be provided to the chemical entity recognition system 120. Accordingly, the chemical entity recognition system 120 may tag the one or more chemical entities in a corresponding normalized patent document of the plurality of unified patent documents, extract one or more additional chemical entities from the plurality of unified patent documents, assign a confidence score to each of the one or more additional chemical entities, and label each of the one or more additional chemical entities as relevant or irrelevant to an associated patent document based on information contained in the chemical patent corpus, as described in greater detail herein. Operation according to block 410 may be performed by one or more hardware processors configured by machine-readable instructions including logic that is the same as or similar to patent corpus providing logic 248, in accordance with one or more implementations.

Figure 5:
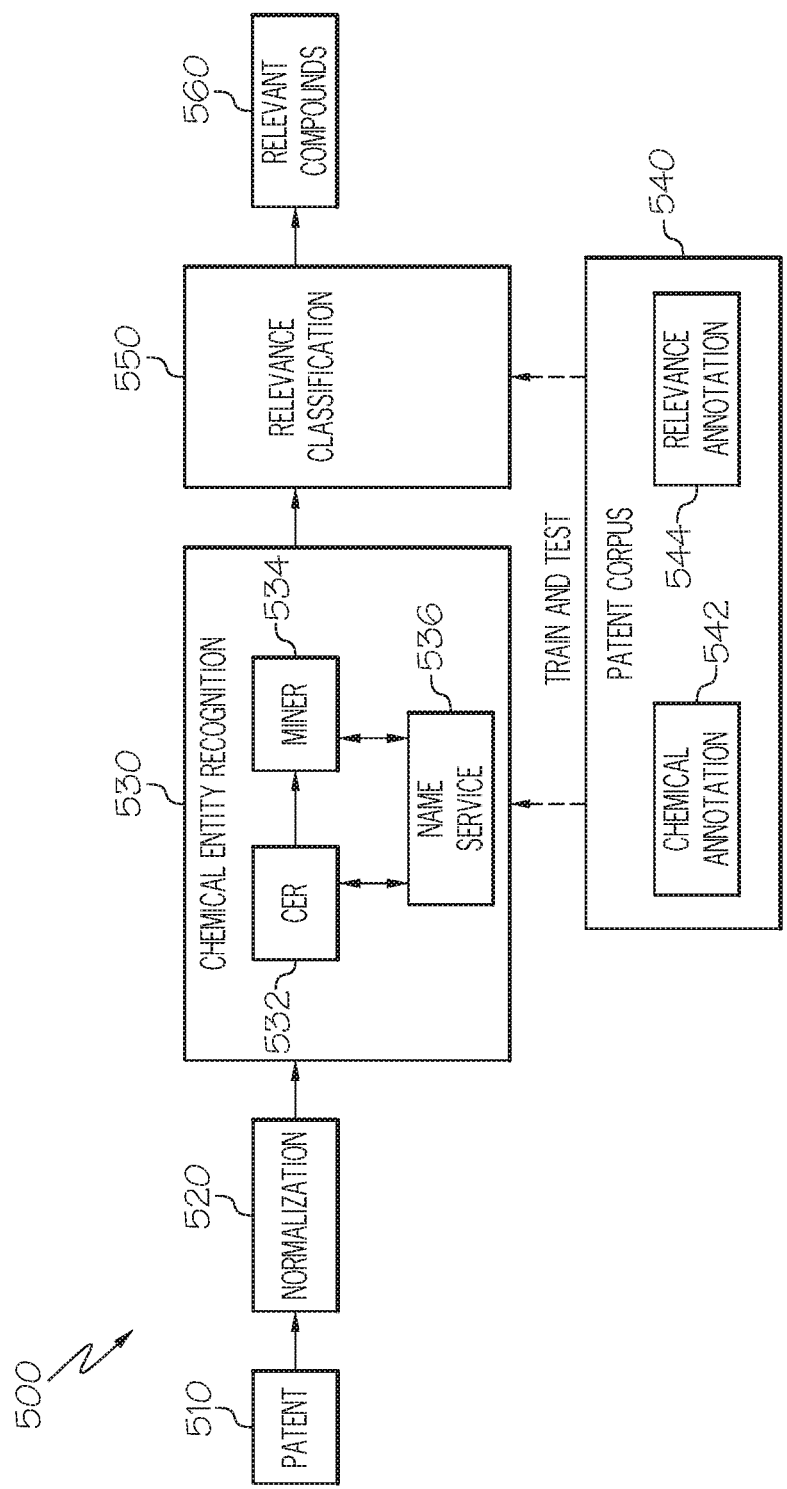
FIG. 5 depicts a flow diagram of an illustrative method of classifying relevancy according to one or more embodiments shown and described herein.

Referring now to FIG. 5, an illustrative method of classifying relevancy is depicted. The chemical patents are pulled through patent offices at block 510. The patent source documents are normalized into a unified format at block 520. They are then fed into the chemical entity recognition system 530 that consists of two different named-entity extraction systems, Chemical Entity Recognizer (CER) 532 (Elsevier, Frankfurt DE) and a mining program 534 such as, for example, OCMiner (OntoChem, Halle DE). CER 532 extracts chemical entities and tags them in the normalized input document. OCMiner 534 further enriches the output of CER 532 by extracting additional chemical entities and assigning confidence scores to all extracted entities of both systems. The associated structures of chemical compounds extracted by CER 532 or OCMiner 534 are generated, validated, and standardized using a name service 536, such as, for example, the Reaxys Name Service (Elsevier, B. V., Amsterdam NL). The chemical annotations 542 in the patent corpus 540 are used to train and test the chemical entity recognition system 530. The relevancy annotations 544 in the corpus are used to train and test the relevancy classifier 550, which labels the chemical entities extracted by the chemical entity recognition system as relevant or irrelevant at block 560. Each of the components will now be described in greater detail.

Normalization

It may be necessary to normalize the variety of input sources and file into a unified text representation. The normalization step is performed by converting all input files (e.g. XML, HTML and PDF) into a unified XML representation format. Predefined XML tags corresponding to heuristic information such as document sections (title, abstract, claims, description and metadata) are used within this unified representation. The normalization also converts all character encodings into a particular format, such as, for example, UTF-8 (8-bit Unicode Transformation Format).

During normalization, a one-to-one mapping may be stored between each character in the original text and the corresponding character in the normalized document. This may provide a possibility to go back to the original document from the normalized text and vice versa. This may also minimize efforts to update the annotations in the patent corpus in case of changes in normalization methodology (note that the documents in the corpus have also been normalized).

Patent Corpus Development

Figure 6:
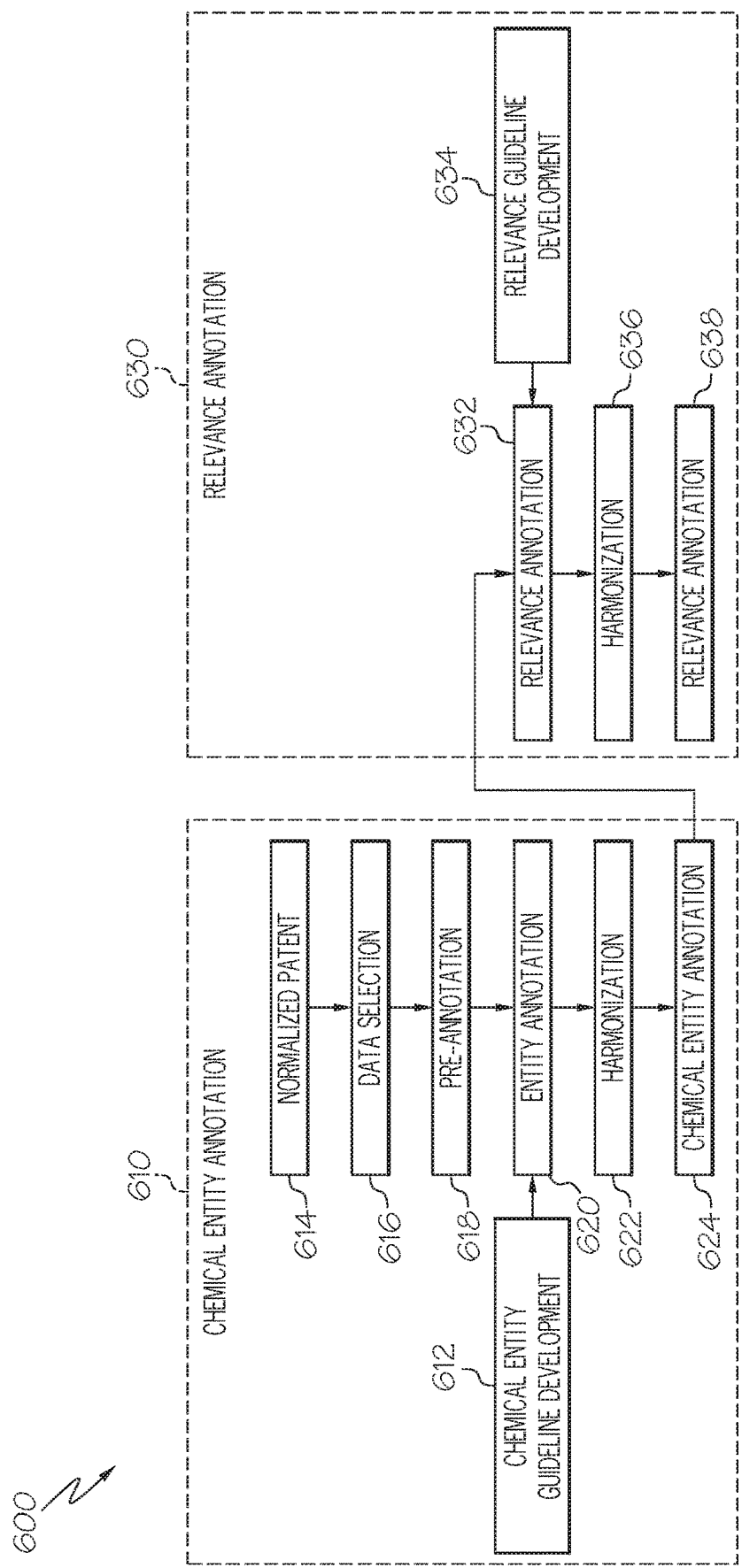
FIG. 6 depicts a flow diagram of an illustrative method of developing a patent corpus according to one or more embodiments shown and described herein.

The development of the chemical patent corpus with chemical entity and relevancy annotations may be completed in two phases. FIG. 6 depicts an illustrative corpus creation process 600. A first phase 610 focuses on building a corpus with chemical entity annotations. The second phase 630 may include using the corpus obtained from the first phase 610 to assign relevancy annotations to the entities annotated in the first phase 610. In the second phase 630, annotators may also flag any compounds with spelling mistakes. For each phase, a set of well-defined guidelines may be developed that help achieve annotation consistency.

Chemical Entity Annotation Guideline

The chemical entity annotation guideline according to blocks 610 and 612 may be developed based on patent corpus development guidelines, such as the guidelines mentioned in "Annotated chemical patent corpus: a gold standard for text mining" authored by Akhondi, S. A., Klenner, A. G., Tyrchan, C. et al. (2014) and published in PLoS One, 9, e107477 and incorporated herein by reference in its entirety. The guidelines define the entities to be annotated. For each entity, positive and negative examples were provided. Additionally, any exception was defined and illustrated through examples. The guideline also defined how the annotation should be performed within the brat rapid annotation tool (available at http://brat.nlplab.org/). The brat tool allows online annotation of text using pre-defined entity types. Annotators were asked to annotate chemical compounds (e.g. tetrahydrofuran), chemical classes (e.g. zirconium alkoxide) and suffixes or prefixes of these compounds (e.g. 'stabilized' as prefix in 'stabilized zirconia' and 'nanoparticles' as suffix in 'silver nanoparticles').

Chemical compounds could be annotated in three categories: mono-component compound (pure chemical compounds, e.g. systematic identifiers, trivial names, elements, and chemical formulas), compound mixture part (e.g. 'Magnesiaflux', which scientifically is a mixture of 30% $MgF_2$ and 70% MgO) or prophetic compound (specific compounds that are uncharacterized within the text and are mentioned in claims or descriptions only for intellectual property protection).

Compound classes could be annotated in six categories: chemical class (natural products or substructure names, e.g. heterocycle), biomolecules (e.g. insulin), polymers (e.g. polyethylene), mixture classes (e.g. opium), mixture part classes (e.g. quinupristin) or Markush (textual description of a Markush formula, e.g. $H_aX_bC$—C—H).

Relevancy Annotation Guideline

For the relevancy annotation according to block 630, a new set of guidelines were developed, which defined how relevant compounds should be identified. The legal status of a compound (e.g. prophetic or claimed) and its characterization (e.g. NMR or MS measurement), properties (e.g. superconductivity), effects (e.g. toxicity) and transformation (e.g. reaction) were taken into consideration for defining the guidelines. The relevancy annotation did not include suffixes and prefixes of compounds. In brief, relevancy is assigned as follows: Prophetic compounds and Markush classes are relevant. Compound mixture parts, mixture part classes, mixture classes, polymers, and biomolecules are irrelevant. Mono-component compounds and chemical-classes are assigned relevance based on the context of the full patent text. They are considered relevant to the patent if (a) the entity is present in the title or abstract section of the patent, (b) the entity is part of a reaction context (e.g. product, intermediate product, catalyst or starting material used in synthetic procedures) or (c) the entity or its measured property belongs to the invention in the claim section and is connected to the core invention of the patent document. The mono-component compounds and chemical classes are irrelevant if (a) the entity is only introduced for further explanation and is described beyond the invention, (b) the entity is described for reference or comparison or (c) the entity is involved in a chemical reaction but not a starting material, product or catalyst.

Data Selection

Patent documents can be long and extensive. Annotation of full-text documents can be time-consuming and expensive. Complexity may be reduced by selecting snippets of patent text from a large set of patent documents that represented the diversity of the data according to block 616. For example, all EPO patents with IPC class A or C (corresponding to chemistry) from a 3-month period in 2016 may be downloaded. This may yield 19,274 patents, which are divided into snippets as follows. First, each patent is divided into six snippets containing title, abstract, claims, description, metadata, and non-English section of the patent. Second, since the performance of the brat toolkit drops on long files, snippets of more than 50 paragraphs are further divided into multiple snippets. From this set of snippets, a small set was selected for annotation at block 618.

Random stratified sampling may be performed based on the sub-classes of IPC A and C (list available at https://www.wipoint/classifications/ipc/en/). In addition, the following conditions were satisfied: 10% of the snippets were from titles, 10% from abstracts, 40% from claims, and 40% from descriptions, and all snippets were from different patents.

A total of 131 snippets were selected, which constitute a patent corpus. The IPC sub-classes that occurred most frequently were A61K, A61B, C07D, A61F, A61M and C12N.

Chemical Entity Annotation Process

Figure 7:
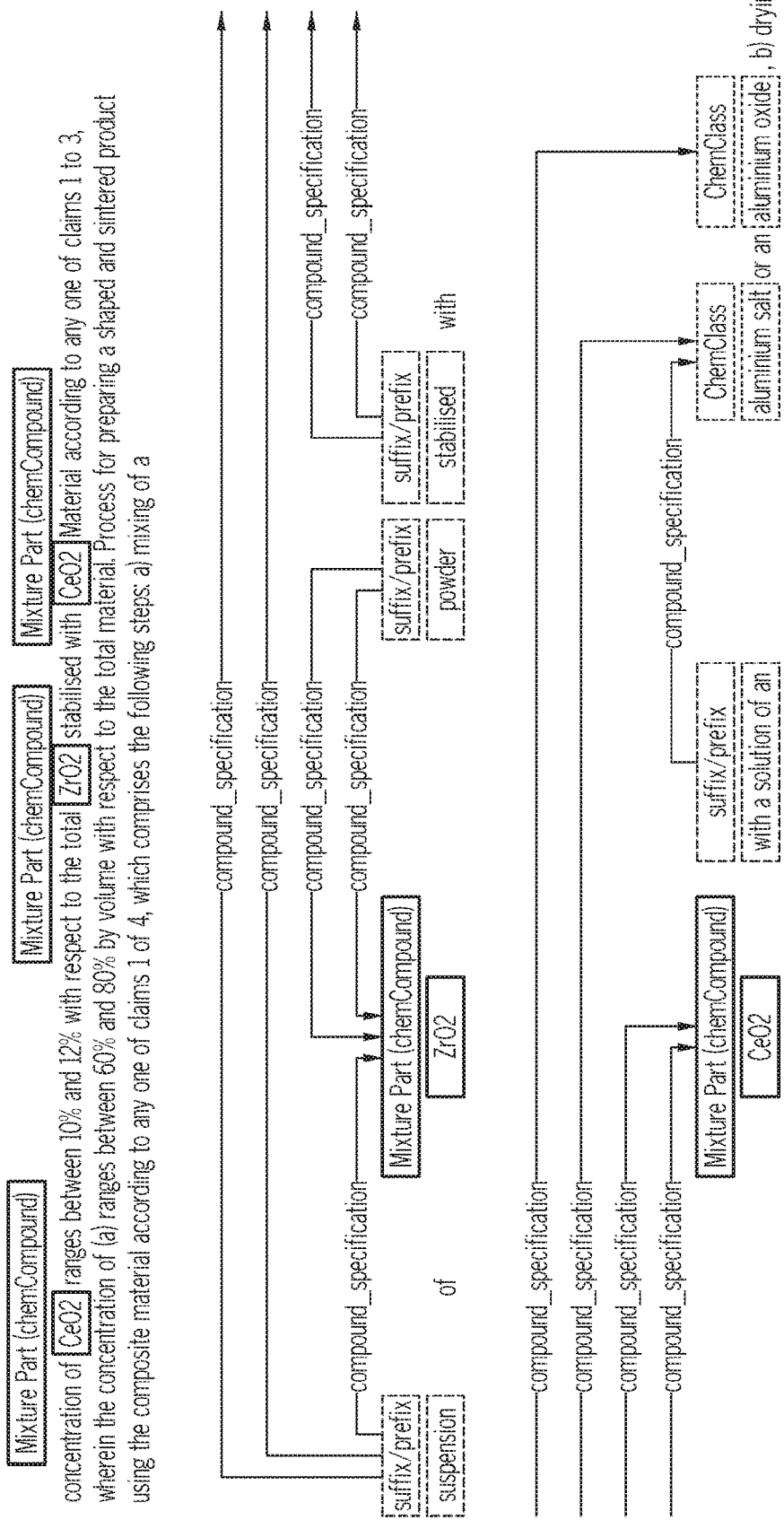
FIG. 7 depicts an illustrative user interface depicting annotations in a patent document using an annotation tool according to one or more embodiments shown and described herein.

In one example, ten (10) chemistry graduates were selected as annotators for annotation according to block 620. The annotators were located in different European countries. To train the annotators, 11 of the 131 patent snippets were distributed among the annotators using the brat annotation tool. The snippets were pre-annotated at block 618 with an untuned version of the chemical entity recognition software that is used in the present disclosure (only for categories monocomponent compound and chemical class). The pre-annotations were displayed in brat, and annotators were asked to modify incorrect pre-annotated entities (wrong boundary or entity type) and add missing entities according to the guideline, as depicted in FIG. 7.

Still referring to FIG. 6, the eleven (11) snippets were also annotated by two subject-matter experts (SMEs) who defined the guidelines. The SMEs had PhDs in chemistry and about 15 years of professional experience in the field. Any discrepancies between the annotations of the two SMEs were resolved in consensus discussions. The resulting annotations (the training corpus) were used as a reference and compared to the annotations of each of the other annotators by inter-annotator agreement (IAA) scores. The F-score (harmonic mean of recall and precision) was used as a measure of IAA. Several review sessions were held to compare annotations and resolve inconsistencies, and the annotation guideline was updated for clarity if needed. For each annotator, training continued until the IAA between the annotator and the SMEs was at least 85%.

After successful completion of the training, the remaining 120 snippets of the corpus were distributed between the annotators. Each snippet was annotated by three annotators, after which the annotations were harmonized at block 622. The harmonization was done for each entity as follows: if at least two annotators agreed on the entity boundaries and the entity type, that annotation was added to the gold-standard set, otherwise an SME adjudicated the disagreement. This resulted in the chemical entity annotation at block 624.

Relevancy Annotation Process

The same training corpus of 11 snippets was also annotated for relevant compounds by the annotators and the SMEs at block 632. They were provided with the reference annotations of the chemical entities and had to indicate whether the annotations were relevant or not. For every snippet, the corresponding full patent text was delivered to the annotators and the SMEs. This allowed them to determine relevance based on the complete document, which included title, abstract, description and claims. The relevancy annotations of the annotators and SMEs were compared, and questions were resolved at blocks 636 and 638.

After training, the 120 snippets of the chemical entity corpus created in the previous step were distributed between the annotators. Each snippet was annotated by five annotators. If more than three annotators annotated the chemical entity as relevant it was considered relevant. If three annotators annotated the chemical entity as relevant it was considered equivocal. If less than three annotators annotated the chemical entity as relevant, it was considered irrelevant. The equivocal category was introduced since relevance determination is sometimes complex and judged differently by different experts (as relevance is decided based on the full text). To capture this complexity, no attempt to resolve ambiguity by enforcing a decision by the SMEs was made. As per the guidelines developed in block 634, relevance is document based. As a result, if a compound is considered relevant at one occurrence in the snippet, it is marked automatically relevant at any other occurrence. Finally, the annotators were also asked to annotate any spelling errors. This annotation can be helpful for improvement of chemical entity recognition systems. As spelling errors can be hard to detect, each spelling-error annotation was accepted, irrespective of the number of annotators that made that annotation. The corpus was divided into a development and test set consisting of 50 and 70 snippets, respectively.

Chemical Entity Recognition

Non-statistical approaches for chemical entity recognition were focused on, as a chemical structure was to be associated to extracted chemical compounds. A dictionary-based approach was used in combination with a morphology-based approach to identify chemical entities. The structures of these compounds were produced, validated and standardized using Reaxys Name Service described herein. Since the gold-standard annotations showed that only a small set of relevant entities are from compound class categories (see results), we decided to reduce our chemical entity recognition scope to the identification and classification of chemical compounds.

Name Service

The Reaxys system uses a name-to-structure toolkit (Reaxys Name Service) and a set of standardization rules (e.g. eliminate hydrogen bonds when constructing structures) when new compounds are inserted into the database. In the present disclosure, the Name Service was used to convert names to structures and standardize those structures as well as the structures in different dictionaries based on the Reaxys standardization rules, and to validate the structures assigned to chemical compounds.

Chemical Entity Recognizers

An ensemble system was used for chemical entity recognition. First, Elsevier's CER software was used. CER identifies and tags chemical compounds and their physical properties (e.g. color, melting point, and boiling point) within a text document and converts extracted compounds into a chemical structure (e.g., using Name Service). In addition, CER also identifies chemical reactions and chemical properties within the patent document. The software uses a combination of dictionary-based and morphology-based approaches to extract chemical compounds from patents. CER was loaded with a dictionary derived from the manually curated compounds in the Reaxys database. Further, an exclusion list was used to filter out any noise (e.g. frequent compounds such as oxygen) from the extracted compounds. The morphology-based approach in CER identifies different elements within a compound and combines them to create the final compound only if it can validate the compound based on its structural chemistry (e.g. can two elements bind with each other in this manner). This validation is done on the structural level and through a set of pre-defined rules processed by the Name Service. CER cannot assign the extracted compounds to the different compound groups that are defined in the guidelines.

Second, a mining software program (e.g., a modified version of OCMiner) was used to identify chemical entities. OCMiner also uses a dictionary-based approach along with a morphology-based approach to extract chemical compounds. The dictionary used for OCMiner was generated from a compound database built from various publicly available sources such as PubChem, DrugBank, ChEMBL, ChEBI, and/or the like. To improve the quality of the dictionary, frequent chemical identifiers that were associated to more than one structure were manually resolved and the name-to-structure mappings of the most-frequent identifiers were manually validated. OCMiner also used other resolution mechanisms to improve the quality of the dictionary (e.g. counting the number of stereocenters). The Name Service was used to standardize the compounds within these dictionaries based on the same standardization rules applied by CER and Reaxys. In comparison to CER, OCMiner has additional functionality, such as abbreviation expansion and spelling-error correction. The software also has post-dictionary modules to identify systematic names. In a separate module built for the present disclosure, OCMiner cleans up the chemical entities identified by both CER and OCMiner (e.g. overlapping annotations and combination of simple annotations to complex entities) and assigns compounds to the different compound groups. Finally, OCMiner generates a confidence score for all recognized chemical entities extracted by CER or OCMiner.

Relevancy Classification

Relevance of a chemical compound is defined based on the context of the full patent document. To identify the relevance of a specific entity, the complete patent document should be analyzed for that entity. Therefore, statistical information was gathered for each unique entity (recognized in the snippet) from the whole patent text and used that information to classify the extracted entity. Relevancy classification was expressed as a scalar relevance score that after normalization can vary between zero (irrelevant) and one (relevant). The corpus was divided into a training set and a test set to experimentally find the best threshold for relevancy classification. The training set was used along with the relevance score to define the best cut-off point for the relevancy classification. The results were then tested on the test set.

Relevance Score

Several features derived from the full text are used to calculate the relevancy score. The relevancy score is a linear combination of these features, where the coefficients (or weights) are heuristically determined. These features include the following:

A. Compound frequency: Frequency of the compound within the patent document. Usually compounds that occur frequently in a patent document are less relevant (due to the nature of patents), unless the compound is unique to the patent.

B. Compound section: Occurrence of the compound within specific sections of a patent document (e.g. title and claim). A compound in a claim section is more relevant than a compound in a description section of a patent. If a compound appears in multiple sections, the compound may be prioritized based on which of the sections it appears in the following order: Title, Abstract, Claim, and Description.

C. Compound length: Length of the extracted term. Longer names may be more likely to be International Union of Pure and Applied Chemistry (IUPAC) names and hence have a higher chance of being relevant.

D. Surrounding characters: Occurrence of the compound within special characters (e.g. '[', '('). Examples are usually mentioned between special characters and they will be less relevant.

E. Compound section uniqueness: Compound single occurrence within a section of the patent. If a compound is mentioned once in the claims and a few times in the description, the compound has higher probability to be relevant than the other way around.

F. Compound without solvent: If the compound does not contain solvents or laboratory chemicals, there is a higher probability of the compound being relevant.

G. Compound wide usage: Presence of the compound in one of a number of predefined groups representing the frequency of compounds in a large set of chemistry patent documents. To create the groups, all chemical entities from a large set of patent documents (selection of chemical patents in 2015, excluding patents from the patent corpus) were extracted using OCMiner and ranked according to their frequency of occurrence. The resultant compound list was divided in 16 equally-sized groups (16 an arbitrary number). Note here that the calculation is extended to data derived from a larger set of patent documents. If a compound is frequently mentioned in other patent documents, then there is a lower probability of it being relevant.

It should be understood that the above mentioned features may later be used by a machine learning algorithm, such as, for example, a machine learning algorithm contained within the chemical entity recognition system 120, to determine whether a particular chemical entity is relevant to the patent document from which the chemical entity was extracted.

Performance Evaluation

The performance of the system against the gold-standard annotations was evaluated using recall, precision and F-score, given the number of true positives (TP), false positives (FP), and false negatives (FN). For the entity recognition task, TP represents the total number of correctly identified chemical entities by the system (based on starting and ending position of the entity in text), FP represents the number of entities wrongly identified by the system, and FN represents the number of entities that are missed by the system. Recall, precision and F-score metrics are calculated as follows: recall=TP/(TP+FN), precision=TP/(TP+FP) and F-score=2×precision×recall/(precision+recall).

For the relevancy classification task, TP, FP and FN are determined at the document level and only take into account the unique entities identified in each of the documents. TP represents the number of compounds correctly classified as relevant, FP represents the number of compounds wrongly classified as relevant by the system, and FN represents the number of relevant compounds missed by the system. The compounds in the corpus that were annotated as equivocal were disregarded from relevancy calculation. This choice was made for those compounds where evidently human annotators could not agree on their relevance.

RESULTS

Chemical Entity Annotation

The average IAA between the annotators on the 11 training documents initially was 72% and reached 92% after two rounds of training. On the gold-standard set of 120 snippets, the average IAA between the annotators and the harmonized annotations was 87%. This was higher than the IAA between pre-annotation and the gold-standard (77% for mono-component compound and 23% for chemical class) indicating that annotators considerably changed the pre-annotations. Table 1 below provides the frequency of entities within the corpus. Overall, 18,789 chemical entities were annotated, of which 15,199 were chemical compounds and 3,590 were chemical classes. This resulted in an average of around 150 annotations per snippet. The majority of the annotations consisted of mono-component compounds (13, 564). In addition, the corpus contains 1848 relationships from chemical compound or classes to 628 suffix or prefixes annotations (a suffix or prefix can have a relationship with one or more chemical compounds or classes).

Relevancy Annotation

All 18,789 chemical entities were annotated for relevance, as shown in Table 1 below. Of the 15,199 compounds, 1509 (9.9%) were considered relevant and 362 (2.4%) were equivocal. Of the 3590 chemical classes, 266 (7.4%) were relevant, while 30 (0/8%) were equivocal. Thus, the majority of entities were considered irrelevant (87.7% of the compounds and 91.8% of the classes).

TABLE 1

Number of Annotations in the Gold-Standard Set

| Annotation type | Annotation subtype | Annotation | Relevant | Equivocal | Irrelevant |
|---|---|---|---|---|---|
| Compounds | Mono Component | 13,564 | 883 | 362 | 12,319 |
| | Mixture part | 1010 | 0 | 0 | 1010 |
| | Prophetic | 625 | 625 | 0 | 0 |
| Classes | Chemical Class | 1848 | 249 | 30 | 1569 |
| | Biomolecule | 1039 | 0 | 0 | 1039 |
| | Markush | 17 | 17 | 0 | 0 |
| | Mixture | 286 | 0 | 0 | 286 |
| | Mixture Part | 174 | 0 | 0 | 174 |
| | Polymer | 226 | 0 | 0 | 226 |
| Total Chemical Entities | | 18,789 | 1774 | 392 | 16,623 |
| Other | Suffix and Prefix | 628 | — | — | — |
| | Relation | 1848 | — | — | — |

TABLE 2

Performance of the chemical entity recognition system on compound recognition for different confidence score thresholds

| Confidence Score Threshold | Development Precision | Recall | F-Score | Test Precision | Recall | F-Score |
|---|---|---|---|---|---|---|
| 0.0 | 88.5 | 79.3 | 83.6 | 86.5 | 82.3 | 84.3 |
| 0.1 | 88.6 | 79.1 | 83.6 | 89.1 | 82.3 | 85.6 |
| 0.2 | 89.1 | 78.9 | 83.7 | 90.1 | 82.3 | 86.2 |
| 0.3 | 89.1 | 78.6 | 83.5 | 90.1 | 81.6 | 85.7 |
| 0.4 | 89.1 | 78.4 | 83.4 | 90.1 | 81.5 | 85.6 |
| 0.5 | 89.1 | 78.4 | 83.4 | 90.1 | 81.5 | 85.6 |
| 0.6 | 89.1 | 78.4 | 83.4 | 90.1 | 81.3 | 85.5 |
| 0.7 | 87.2 | 60.6 | 71.5 | 90.7 | 69.4 | 78.6 |
| 0.8 | 82.0 | 36.2 | 50.3 | 96.2 | 39.8 | 56.3 |
| 0.9 | 100.0 | 0.1 | 0.2 | 96.4 | 0.8 | 1.7 |
| 1.0 | 100.0 | 0.1 | 0.2 | 97.2 | 0.8 | 1.7 |

Chemical Entity Recognition

The performance of the chemical entity recognition system on compound recognition is shown in Table 2 above for different thresholds of the confidence score. On the development set, a threshold of 0.2 yielded the best F-score of 83.7% (precision, 89.1%, and recall, 78.9%). For this threshold, the best result was also obtained on the test set (F-score, 86.2%; precision, 90.1%; and recall, 82.3%). Error analysis of the results indicated that the performance of the system may further be improved by better recognizing prophetic compounds, reactants, and products of synthesis procedures.

Relevancy Classification

Figure 8:
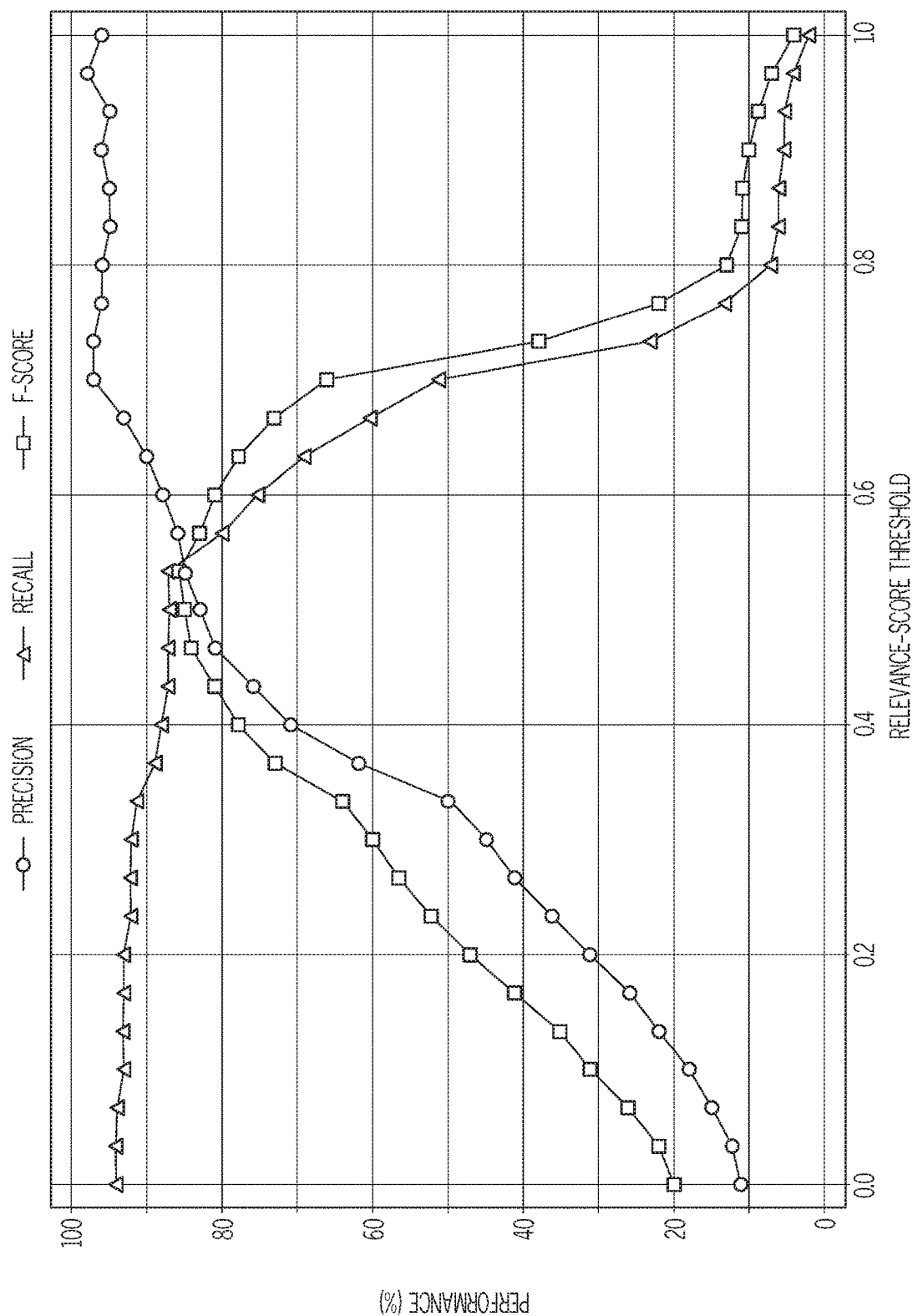
FIG. 8 depicts a chart indicating a performance of a chemical entity recognition system based on precision, recall, and F-score according to one or more embodiments shown and described herein.

FIG. 8 depicts the performance of the chemical entity recognition system for different relevance score thresholds on the training set. The best performance (in terms of F-score) was obtained for a relevance score threshold of 0.53, with a precision of 85%, a recall of 87% and an F-score of 86%. For the same threshold, the performance on the test set was slightly lower with 81% precision and 82% recall, resulting in an F-score of 82%. Further investigation into the compounds that the system classified as relevant showed that 97% of these compounds were annotated as chemical compounds in the chemical entity corpus. Therefore, only 3% of the compounds classified by the system as relevant were not chemical entities.

The relevancy classification is dependent on the performance of the chemical entity recognition system in two ways. First, only compounds that are found by the CER can be classified as relevant. Second, the relevance-score features for a given chemical entity are based on the full patent text. The recognizer needs to correctly identify all occurrences of that entity in the full text. To assess the effect of the first dependency on the performance of the relevance system, the gold-standard chemical entities were fed as input to the chemical entity recognition system (simulating a scenario where the chemical entity recognition system has a precision and recall of 100%). Apart from the patent snippet, all other parts of the full patent document were analyzed with the original system because gold-standard annotations were not available. When evaluated on the test set, the relevance classification system obtained 93% precision, 88% recall and 91% F-score. Further investigation into these scores indicated that the system could have performed better if the second dependency is also eliminated.

The contribution of individual relevancy features to the performance of the chemical entity classification system was investigated. For this, each feature was removed in turn from the relevance score and the relevance score threshold was adjusted for optimal performance. Table 3 below shows that the length of the compound is a major indicator of the relevance of the compound (10 percentage points added value). Additionally, the patent section in which the compound was found and compound wide usage in other publications are also good indicators of the relevance of the compound (around 5 percentage points added value). The other features contribute between 1 and 2 percentage points to the relevancy classification performance.

Figure 9:
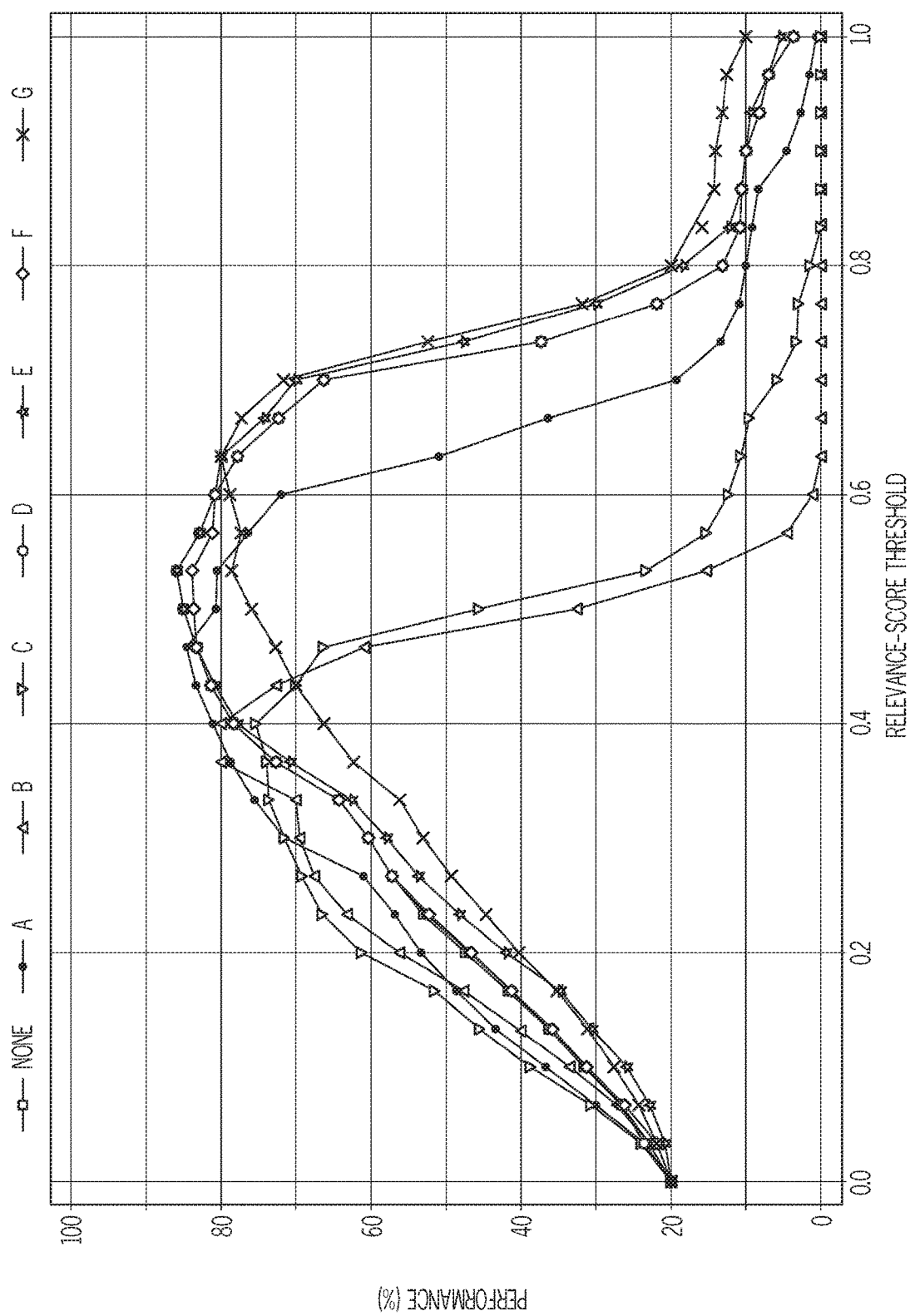
FIG. 9 depicts a chart indicating a performance of a relevancy classification system as a function of a relevance-score threshold when a relevancy feature is removed according to one or more embodiments shown and described herein.

As can be seen from Table 3 below, leaving out a feature can affect the optimal value of the relevance-score threshold. FIG. 9 shows the performance of the chemical entity classification system as a function of the threshold value when a feature is left out.

TABLE 3

The added value of individual features based on "leave-one-out" methodology

| Setting | Threshold | Precision | Recall | F-Score | Added Value |
|---|---|---|---|---|---|
| All features | 0.53 | 84.8 | 86.8 | 85.8 | — |
| A-Compound Frequency | 0.47 | 82.8 | 86.2 | 84.5 | 1.3 |
| B-Compound Section | 0.40 | 95.5 | 0.0 | 80.8 | 5.0 |
| C-Compound Length | 0.40 | 75.9 | 75.5 | 75.7 | 10.1 |
| D-Surrounding Characters | 0.53 | 85.1 | 82.9 | 84.0 | 1.8 |
| E-Compound Section Uniqueness | 0.53 | 84.8 | 82.9 | 83.9 | 1.9 |
| F-Compound Without Solvent | 0.53 | 85.1 | 82.9 | 84.0 | 1.8 |
| G-Compound Wide Usage | 0.53 | 83.9 | 76.4 | 80.0 | 5.8 |

DISCUSSION

Relevance of a chemical compound is based on the context of the full patent document. Generally, a relevant compound is a compound that plays a major role in the patent document (e.g. a product of a reaction that is mentioned in the Claims section of a patent document). The present disclosure shows that these compounds are a small subset (<10%) of all compounds mentioned in the textual part of a patent document.

The present disclosure presents a two-step approach to identify relevant compounds in patent documents: compound identification (first step) followed by compound classification (second step). This approach allows the use of the output of the first step for additional purposes (such as indexing chemical compounds mentioned in patent documents) but at the same time introduces dependencies. Obtaining high precision and recall values in the first step is essential for the success of the second step. An ensemble approach combining dictionary-based and morphology-based approaches were used to obtain high precision and recall. These approaches require a small annotated corpus and can provide a structural representation of the extracted compounds. Associating correct chemical structures to compounds is essential when extracting chemical compounds. To reduce the possibility of associating a compound with the wrong structure, the structures of compounds were regenerated in different databases to structure toolkit (Name Service) and standardized the structures based on standardization rules used for Reaxys.

The structures of non-systematic identifiers associated with a compound within Reaxys are manually drawn by excerpters and are later validated and standardized using Name Service. Adding such structures to the Name Service database allowed a generation of structures for nonsystematic identifiers. The same toolkit with the same standardization functionalities was used to validate compounds extracted using the grammar-based approach. This ensures high quality and consistency of the extracted compounds.

To build the chemical entity recognition system, a patent corpus annotated with chemical entities and their relevance was needed. Currently available patent corpora either are limited to subsections of the patent documents, mostly title and abstract, or had other limitations that prevented their use, such as different guideline definitions (focus on different entity types), harmonization approaches (manual using SMEs vs automation), low or unidentified IAA scores and limited scope of coverage (only one chemical IPC class or one section of a document). The corpus was developed in two steps. First, a chemical entity corpus using random stratified sampling for content selection and manual harmonization was constructed to ensure high quality. Later, this corpus was extended with relevancy annotations. The inherent difficulty of classifying relevance of some compounds by introducing 'equivocal' as a classification was taken into account in the corpus. Chemical compounds identified as equivocal can be classified as both relevant and irrelevant. The system can assign relevant or irrelevant for compounds extracted in this area. Any compound identified as equivocal was disregarded from evaluation. Using five annotators for relevancy annotation, the equivocal label is only limited to about 2% of the compounds.

Normalized patent documents were used to develop the corpus and the system. Any change in the normalization approach will lead to changes to the corpus and might result in a need for retraining the system. This dependency was reduced by finalizing the normalization before developing the corpus and the software. One-to-one mapping between the original patent document and the normalized patent document was also introduced to allow possible changes to the corpus with limited efforts. The chemical entity recognition system has lower dependency to the normalization step as its performance is calculated on unique mentions of compounds within a patent. The dependency to the normalization step relies on the quality of the patent source file. Digital patent documents (e.g. from EPO or USPTO) have a higher quality than OCR patent documents (e.g. from WIPO)]. Therefore, the system is more dependable on the normalization when dealing with OCR patents.

The chemical entity recognition system showed a precision of 90.1% and a recall of 82.3% for compound recognition on EPO patents. The state-of-the-art statistical systems (tested on patent title and abstract) have obtained higher recall (precision of 87.5% and recall of 91.3%). These systems do not generate structures for the identified chemical compounds. Error analysis of the system disclosed herein indicated that the loss in recall in our system is mainly due to the fact that reactants and products of synthesis procedures are not recognized, and prophetic compounds are missed. Identification of prophetic compounds may be improved by taking into account trigger phrases (e.g. 'The compound of claim is:', 'A compound selected from') or negative triggers for these compounds (e.g. 'catalysts').

It should now be understood that systems, methods, and computer-readable media described herein automatically extract chemical compounds from a patent document and determine the chemical compound's relevance to that patent document. The systems, methods, and computer-readable media described herein include a training device that is particularly configured to pull patent documents from a database, normalize the patent documents, and feed the patent documents to a chemical entity recognition system such that the chemical entity recognition system, once trained, can automatically recognize chemical compounds within the normalized patent documents and determine whether the chemical compounds are relevant or irrelevant to the associated patent documents.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of training and using a chemical entity recognition system to extract and to determine one or more chemical compounds from a patent document and determine a relevance of the one or more chemical compounds to the patent document, the method comprising:

obtaining, by a processing device, a plurality of patent documents from one or more patent databases;

normalizing, by the processing device, each patent document of the plurality of patent documents into a unified format to achieve a plurality of unified patent documents;

generating, by the processing device, a chemical patent corpus from the plurality of unified patent documents, the chemical patent corpus comprising one or more chemical entities extracted from the plurality of unified patent document, each of the one or more chemical entities comprising one or more relevancy annotations, the one or more relevancy annotations indicating a relevance to the patent document from which the chemical entity is extracted, wherein a relevant compound for the one or more relevancy annotations is indicated for each of a prophetic compound and a Markush class, an irrelevant compound for the one or more relevancy annotations is a compound mixture part, a mixture part class, a mixture class, a polymer, and a biomolecule, and a mono-component compound and a chemical class for the one or more relevancy annotations are each relevant to the patent when the chemical entity is present in the title or abstract section of the patent document, and the chemical entity is part of a reaction context, the chemical entity or a measured property of the chemical entity is in a claim section of the patent document;

providing, by the processing device, the chemical patent corpus to the chemical entity recognition system, wherein the chemical entity recognition system, in response to receiving the chemical patent corpus, tags the one or more chemical entities in a corresponding normalized patent document of the plurality of unified patent documents and extracts one or more additional chemical entities from the plurality of unified patent documents;

calculating, by the chemical entity recognition system, a confidence score for each of the one or more additional chemical entities extracted from an associated patent document;

determining, by the chemical entity recognition system, based at least in part on the confidence score, a label for each of the one or more additional chemical entities, wherein each label indicates the one or more additional chemical entities is either relevant or irrelevant to the associated patent document; and assigning, by the chemical entity recognition system, the confidence score and the label for each of the one or more additional chemical entities to the associated patent document, wherein the confidence score of each additional chemical entity extracted from the associated patent document is a linear combination of features for a compound representing the additional chemical entity, the features comprising a frequency of a compound in a patent document, an occurrence of a compound within pre-defined sections of a patent document, a length of a term, an occurrence of a compound within special characters, an occurrence of a single compound within a section of a patent document, a compound not containing solvents or laboratory chemicals, and a presence of a compound in one or more predefined groups representing a frequency of compounds in a large set of chemistry patent documents.

2. The method of claim 1, wherein obtaining the plurality of patent documents from the one or more patent databases comprises obtaining patent documents that are classified as chemistry related patent documents.

3. The method of claim 1, wherein normalizing each patent document of the plurality of patent documents comprises converting the plurality of patent documents into a unified XML representation format, utilizing one or more predefined XML tags corresponding to heuristic information within the plurality of patent documents, and storing one-to-one mapping between each character in an original text of each patent document and a corresponding character in a normalized patent document.

4. The method of claim 1, wherein generating the chemical patent corpus comprises:

identifying a chemical compound within text contained in each patent document of the plurality of unified patent documents;

accessing a physical properties database and obtaining one or more physical properties of the identified chemical compound; and generating a chemical structure corresponding to the chemical compound based on the one or more physical properties.

5. The method of claim 4, wherein identifying the chemical compound comprises utilizing one or more of a dictionary-based approach and a morphology-based approach to identify the chemical compound, wherein the morphology-based approach comprises identifying one or more elements within the chemical compound and combining the one or more elements to create the chemical compound if the chemical compound is validated based on a structural chemistry of the chemical compound.

6. The method of claim 1, wherein generating the chemical patent corpus from the plurality of unified patent documents comprises annotating each of the plurality of unified patent documents with one or more of a chemical compound, a compound class, a suffix of a chemical compound, and a prefix of a chemical compound.

7. The method of claim 6, wherein the chemical compound is selected from the mono-component compound, the compound mixture part, or the prophetic compound.

8. The method of claim 6, wherein the compound class is selected from the chemical class, the biomolecule, the polymer, the mixture class, the mixture part class, or the Markush class.

9. A system configured for training and using a chemical entity recognition system to extract and determine one or more chemical compounds from a patent document and determine a relevance of the one or more chemical compounds to the patent document, the system comprising:

one or more hardware processors; and a non-transitory, processor-readable storage medium comprising one or more programming instructions thereon that, when executed, cause the one or more hardware processors to:

obtain a plurality of patent documents from one or more patent databases, normalize each patent document of the plurality of patent documents into a unified format to achieve a plurality of unified patent documents, generate a chemical patent corpus from the plurality of unified patent documents, the chemical patent corpus comprising one or more chemical entities extracted from the plurality of unified patent document, each of the one or more chemical entities comprising one or more relevancy annotations, the one or more relevancy annotations indicating a relevance to the patent document from which the chemical entity is extracted, wherein a relevant compound for the one or more relevancy annotations is indicated for each of a prophetic compound and a Markush class, an irrelevant compound for the one or more relevancy annotations is a compound mixture part, a mixture part class, a mixture class, a polymer, and a biomolecule, and a mono-component compound and a chemical class for the one or more relevancy annotations are each relevant to the patent when the chemical entity is present in the title or abstract section of the patent document, and the chemical entity is part of a reaction context, the chemical entity or a measured property of the chemical entity is in a claim section of the patent document, provide the chemical patent corpus to the chemical entity recognition system, wherein the chemical entity recognition system tags the one or more chemical entities in a corresponding normalized patent document of the plurality of unified patent documents and extracts one or more additional chemical entities from the plurality of unified patent documents, calculate, by the chemical entity recognition system, a confidence score for each of the one or more additional chemical entities extracted from an associated patent document, determine, by the chemical entity recognition system, based at least in part on the confidence score, a label for each of the one or more additional chemical entities, wherein each label indicates the one or more additional chemical entities is either relevant or irrelevant to the associated patent document, and assign, by the chemical entity recognition system, the confidence score and the label for each of the one or more additional chemical entities to the associated patent document, wherein the confidence score of each additional chemical entity extracted from the associated patent document is a linear combination of features for a compound representing the additional chemical entity, the features comprising a frequency of a compound in a patent document, an occurrence of a compound within predefined sections of a patent document, a length of a term, an occurrence of a compound within special characters, an occurrence of a single compound within a section of a patent document, a compound not containing solvents or laboratory chemicals, and a presence of a compound in one or more predefined groups representing a frequency of compounds in a large set of chemistry patent documents.

10. The system of claim 9, wherein the programming instructions that cause the one or more hardware processors to normalize each patent document of the plurality of patent documents comprises programming instructions that, when executed, cause the one or more hardware processors to convert the plurality of patent documents into a unified xml representation format, utilize one or more predefined xml tags corresponding to heuristic information within the plurality of patent documents, and store one-to-one mapping between each character in an original text of each patent document and a corresponding character in a normalized patent document.

11. The system of claim 9, wherein the programming instructions that cause the one or more hardware processors to generate the chemical patent corpus comprises programming instructions that, when executed, cause the one or more hardware processors to:
  identify a chemical compound within text contained in each patent document of the plurality of unified patent documents;
  access a physical properties database and obtaining one or more physical properties of the identified chemical compound; and
  generate a chemical structure corresponding to the chemical compound based on the one or more physical properties.

12. A non-transitory storage medium having executable instructions embodied thereon for causing a processing device to:
  obtain a plurality of patent documents from one or more patent databases;
  normalize each patent document of the plurality of patent documents into a unified format to achieve a plurality of unified patent documents;
  generate a chemical patent corpus from the plurality of unified patent documents, the chemical patent corpus comprising one or more chemical entities extracted from the plurality of unified patent document, each of the one or more chemical entities comprising one or more relevancy annotations, the one or more relevancy annotations indicating a relevance to the patent document from which the chemical entity is extracted, wherein a relevant compound for the one or more relevancy annotations is indicated for each of a prophetic compound and a Markush class, an irrelevant compound for the one or more relevancy annotations is a compound mixture part, a mixture part class, a mixture class, a polymer, and a biomolecule, and a mono-component compound and a chemical class for the one or more relevancy annotations are each relevant to the patent when the chemical entity is present in the title or abstract section of the patent document, and the chemical entity is part of a reaction context, the chemical entity or a measured property of the chemical entity is in a claim section of the patent document;
  provide the chemical patent corpus to the chemical entity recognition system, wherein the chemical entity recognition system tags the one or more chemical entities in a corresponding normalized patent document of the plurality of unified patent documents and extracts one or more additional chemical entities from the plurality of unified patent documents;
  calculate, by the chemical entity recognition system, a confidence score for each of the one or more additional chemical entities extracted from an associated patent document,
  determine, by the chemical entity recognition system, based at least in part on the confidence score, a label for each of the one or more additional chemical entities, wherein each label indicates the one or more additional chemical entities is either relevant or irrelevant to the associated patent document, and
  assign, by the chemical entity recognition system, the confidence score and the label for each of the one or more additional chemical entities to the associated patent document,
  wherein the confidence score of each additional chemical entity extracted from the associated patent document is a linear combination of features for a compound representing the additional chemical entity, the features comprising a frequency of a compound in a patent document, an occurrence of a compound within predefined sections of a patent document, a length of a term, an occurrence of a compound within special characters, an occurrence of a single compound within a section of a patent document, a compound not containing solvents or laboratory chemicals, and a presence of a compound in one or more predefined groups representing a frequency of compounds in a large set of chemistry patent documents.

13. The non-transitory storage medium of claim 12, wherein the executable instructions for causing the processing device to normalize each patent document of the plurality of patent documents comprise executable instructions for causing the processing device to convert the plurality of patent documents into a unified xml representation format, utilize one or more predefined xml tags corresponding to heuristic information within the plurality of patent documents, and store one-to-one mapping between each character in an original text of each patent document and a corresponding character in a normalized patent document.

14. The non-transitory storage medium of claim 12, wherein the programming instructions executable instructions for causing the processing device to generate the chemical patent corpus comprise executable instructions for causing the processing device to:
- identify a chemical compound within text contained in each patent document of the plurality of unified patent documents;
- access a physical properties database and obtaining one or more physical properties of the identified chemical compound; and
- generate a chemical structure corresponding to the chemical compound based on the one or more physical properties.

\* \* \* \* \*